US012198617B2

(12) United States Patent
Kim et al.

(10) Patent No.: US 12,198,617 B2
(45) Date of Patent: Jan. 14, 2025

(54) DISPLAY DEVICE

(71) Applicant: Samsung Display Co., LTD., Yongin-si (KR)

(72) Inventors: Ji Hye Kim, Hwaseong-si (KR); Joon Chul Goh, Suwon-si (KR); Yu Chol Kim, Jeonju-si (KR); Jin Wook Yang, Suwon-si (KR); Ja Kyoung Jin, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 18/547,680

(22) PCT Filed: Aug. 23, 2021

(86) PCT No.: PCT/KR2021/011203

§ 371 (c)(1),
(2) Date: Aug. 23, 2023

(87) PCT Pub. No.: WO2022/196873

PCT Pub. Date: Sep. 22, 2022

(65) Prior Publication Data

US 2024/0054948 A1 Feb. 15, 2024

(30) Foreign Application Priority Data

Mar. 18, 2021 (KR) ........................ 10-2021-0035130

(51) Int. Cl.
*G09G 3/32* (2016.01)

(52) U.S. Cl.
CPC ....... *G09G 3/32* (2013.01); *G09G 2310/0262* (2013.01); *G09G 2310/061* (2013.01); *G09G 2310/08* (2013.01); *G09G 2340/0435* (2013.01)

(58) Field of Classification Search
CPC ............. G09G 3/32; G09G 2310/0262; G09G 2310/061; G09G 2310/08; G09G 2340/0435
See application file for complete search history.

(56) References Cited

U.S. PATENT DOCUMENTS

2016/0124491 A1 5/2016 An et al.
2020/0051496 A1* 2/2020 Kang .................. G09G 3/3225
(Continued)

FOREIGN PATENT DOCUMENTS

KR 10-1446679 B1 11/2014
KR 2016-0052942 A 5/2016
(Continued)

OTHER PUBLICATIONS

International Search Report for corresponding Application No. PCT/KR2021/011203 dated Dec. 7, 2021, 6pp.

*Primary Examiner* — Michael Pervan
(74) *Attorney, Agent, or Firm* — Lewis Roca Rothgerber Christie LLP

(57) ABSTRACT

A display device includes: a display panel including pixels having light-emitting elements; a timing control unit for variably changing the driving frame frequency of the display panel according to the input frame frequency of digital video data; and a data driving unit for outputting data voltages according to the digital video data, wherein the display panel operates at a first frame frequency for a first frame period and operates at a second frame frequency, which is lower than the first frame frequency, for a second frame period, the second frame period includes a data addressing period in which a data voltage corresponding to each of the pixels is applied to the pixels, and a blank period in which no data voltage is applied to each of the pixels, and the blank period
(Continued)

includes a period of initializing a first electrode of a light-emitting element into an initialization voltage.

22 Claims, 22 Drawing Sheets

(56) References Cited

U.S. PATENT DOCUMENTS

| | | | | |
|---|---|---|---|---|
| 2020/0066215 | A1 | 2/2020 | Koo et al. | |
| 2020/0082781 | A1 | 3/2020 | An et al. | |
| 2020/0193915 | A1* | 6/2020 | Noh | G09G 3/3233 |
| 2021/0027712 | A1 | 1/2021 | Kim et al. | |
| 2021/0319755 | A1* | 10/2021 | Kim | G09G 3/3233 |
| 2022/0375414 | A1* | 11/2022 | Kim | G09G 3/3291 |
| 2023/0066949 | A1* | 3/2023 | Jeong | G09G 3/32 |

FOREIGN PATENT DOCUMENTS

| | | | |
|---|---|---|---|
| KR | 2018-0058279 | A | 6/2018 |
| KR | 2018-0076490 | A | 7/2018 |
| KR | 10-1935563 | B1 | 4/2019 |
| KR | 10-2033755 | B1 | 10/2019 |
| KR | 2019-0138718 | A | 12/2019 |
| KR | 2020-0022557 | A | 3/2020 |
| KR | 2020-0030415 | A | 3/2020 |
| KR | 2021-0012509 | A | 2/2021 |
| KR | 10-2290613 | B1 | 8/2021 |
| KR | 10-2309599 | B1 | 10/2021 |
| KR | 10-2462008 | B1 | 11/2022 |

* cited by examiner

FIG. 7

| NUMBER OF ORIGINAL LUMINANCE VALLEYS | NUMBER OF ADDITIONAL LUMINANCE VALLEYS | TOTAL NUMBER OF LUMINANCE VALLEYS | FRAME FREQUENCY |
|---|---|---|---|
| 1 | 0 | 1 | 240 |
| 1 | 1 | 2 | 120 |
| 1 | 2 | 3 | 80 |
| 1 | 3 | 4 | 60 |
| 1 | 4 | 5 | 48 |
| 1 | 5 | 6 | 40 |
| 1 | 6 | 7 | 34.3 |
| 1 | 7 | 8 | 30 |
| 1 | 8 | 9 | 26.7 |
| 1 | 9 | 10 | 24 |
| 1 | 10 | 11 | 21.8 |
| 1 | 11 | 12 | 20 |
| 1 | 12 | 13 | 18.5 |
| 1 | 13 | 14 | 17.1 |
| 1 | 14 | 15 | 16 |
| 1 | 15 | 16 | 15 |
| 1 | 16 | 17 | 14.1 |
| 1 | 17 | 18 | 13.3 |
| 1 | 18 | 19 | 12.6 |
| 1 | 19 | 20 | 12 |

DISPLAY DEVICE

CROSS-REFERENCE TO RELATED APPLICATION

This application is a U.S. National Phase Patent Application of International Patent Application Number PCT/KR2021/011203, filed on Aug. 23, 2021, which claims priority to Korean Patent Application Number 10-2021-0035130, filed on Mar. 18, 2021, the entire content of all of which is incorporated by reference herein.

BACKGROUND

1. Field

The present disclosure relates to a display device.

2. Description of the Related Art

Display devices are becoming more important with developments in multimedia technology. Accordingly, various display devices such as an organic light-emitting diode (OLED) display device, a liquid crystal display (LCD) device, and the like have been used. A display device, which displays an image, includes a display panel such as a light-emitting display panel or an LCD.

Recently, in order to respond to a rapid screen switching when implementing a gaming display, a display device receives digital video data in a variable frame frequency method that varies frame frequency. In this case, a difference may occur in the blank period of the display device in accordance with the frame frequency. For example, the lower the frame frequency, the longer the blank period of the display device. Accordingly, a difference may arise between the luminance of an image displayed at a low frame frequency and the luminance of an image displayed at a high frame frequency.

SUMMARY

To address the aforementioned problems, one or more embodiments of the present disclosure provide a display device capable of preventing or reducing any difference between the luminance of an image displayed at a low frame frequency and the luminance of an image displayed at a high frame frequency, even when being driven in a variable frame frequency method that varies frame frequency.

However, one or more embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to one or more embodiments of the present disclosure, a display device includes a display panel including pixels, each of the pixels including light-emitting elements, which emit light, a timing controller configured to vary a driving frame frequency of the display panel in accordance with an input frame frequency of digital video data, and data drivers configured to output data voltages in accordance with the digital video data. A first frame period, which corresponds to a first frame frequency, and a second frame period, which corresponds to a second frame frequency lower than the first frame frequency, are set under the control of the timing controller. The second frame period includes a data address period, during which the data voltages are applied to the respective pixels, and a blank period, during which the data voltages are not applied to the pixels. The blank period includes an initialization period, during which first electrodes of the light-emitting elements are initialized to an initialization voltage.

A length of the blank period may be equal to or greater than a length of the data addressing period.

The blank period may include a plurality of initialization periods having the initialization period.

The second frame period may be arranged after the first frame period.

The timing controller may be configured to output first digital video data, which is input to the timing controller during the first frame period, to the data drivers during the second frame period. The data drivers may be configured to output the data voltages in accordance with the first digital video data during the second frame period.

The display panel may be driven at a third frame frequency, which is lower than the first frame frequency and higher than the second frame frequency, during a third frame period. The third frame period may include the data address period and the blank period.

A number of initialization periods of the blank period of the third frame period may be the same as a number of initialization periods of the blank period of the second frame period.

A number of initialization periods of the blank period of the third frame period may be greater than a number of initialization periods of the blank period of the second frame period.

The data addressing period of the third frame period nay be equal to the data addressing period of the second frame period.

Each of the pixels may include a first transistor configured to apply a driving current to the light-emitting elements in accordance with a corresponding data voltage, a second transistor between a gate electrode of the first transistor and a data line, a third transistor between a first electrode of the first transistor and a sensing line, a fourth transistor between the first electrode of the first transistor and the first electrodes of the light-emitting elements, a fifth transistor between the first electrodes of the light-emitting elements and the sensing line, and a capacitor between the gate electrode and the first electrode of the first transistor.

During a first period of the first frame period, the corresponding data voltage may be applied to the gate electrode of the first transistor and the initialization voltage may be applied to the first electrodes of the light-emitting elements. During a second period of the first frame period, the light-emitting elements may emit light in accordance with a driving current from the first transistor, which flows in accordance with the corresponding data voltage.

During a first period of the data addressing period of the second frame period, the corresponding data voltage may be applied to the gate electrode of the first transistor and the initialization voltage may be applied to the first electrode of the first transistor and the first electrodes of the light-emitting elements. During a second period of the data addressing period of the second frame period, the light-emitting elements may emit light in accordance with a driving current from the first transistor, which flows in accordance with the corresponding data voltage.

During a third period of the blank period of the second frame period, the initialization voltage may be applied to the first electrodes of the light-emitting elements. During a fourth period of the blank period of the second frame period, the light-emitting elements may be configured to emit light in accordance with a driving current from the first transistor, which flows in accordance with the corresponding data voltage.

During a third period of the blank period of the second frame period, the initialization voltage may be applied to the first electrode of the first transistor and the first electrodes of the light-emitting elements. During a fourth period of the blank period of the second frame period, the light-emitting elements may be configured to emit light in accordance with a driving current from the first transistor, which flows in accordance with the corresponding data voltage.

During a first period of a first sensing period, the corresponding data voltage may be applied to a gate electrode of a first transistor of the pixel and the initialization voltage may be applied to the first electrode of the first transistor and the first electrodes of the light-emitting elements. During a second period of the first sensing period, a threshold voltage of the first transistor may be sampled and sensed via a sensing line.

During a second sensing period, a voltage of the first electrodes of the light-emitting elements may be sensed via a sensing line.

According to one or more embodiments of the present disclosure, a display device includes a data line configured to receive a data voltage, a scan line configured to receive a scan signal, a sensing line configured to receive a scan sensing signal, an emission line configured to receive an emission signal, a bias line configured to receive a scan bias signal, and a pixel connected to the data line, the scan line, the sensing line, the emission line, and the bias line. The pixel includes light-emitting elements configured to emit light in accordance with a driving current, a first transistor configured to apply the driving current to the light-emitting elements in accordance with the data voltage, a second transistor connecting a gate electrode of the first transistor and the data line in accordance with the scan signal from the scan line, a third transistor connecting a first electrode of the first transistor and the sensing line in accordance with the scan sensing signal from the sensing line, a fourth transistor connecting the first electrode of the first transistor and first electrodes of the light-emitting elements in accordance with the emission signal from the emission line, a fifth transistor connecting the first electrodes of the light-emitting elements and the sensing line in accordance with the scan bias signal from the bias line; and a capacitor between the gate electrode and the first electrode of the first transistor. A blank period during which the data voltage is not applied to the pixel includes an initialization period during which the first electrodes of the light-emitting elements are initialized to an initialization voltage from the sensing line.

A first frame period may include first and second periods. During the first period, the scan signal, the scan sensing signal, and the emission signal may have a gate-on voltage and the scan bias signal has a gate-off voltage. During the second period, the emission signal may have the gate-on voltage and the scan signal, the scan sensing signal, and the scan bias signal have the gate-off voltage. The second, third, fourth, and fifth transistors may be turned on by the gate-on voltage and may be turned off by the gate-off voltage.

A second frame period may include a data address period, during which the data voltage is applied to the pixel and the blank period. The data address period may include first and second periods. During the first period, the scan signal, the scan sensing signal, and the emission signal may have a gate-on voltage and the scan bias signal may have a gate-off voltage. During the second period, the emission signal may have the gate-on voltage and the scan signal, the scan sensing signal, and the scan bias signal may have the gate-off voltage. The second, third, fourth, and fifth transistors may be turned on by the gate-on voltage and may be turned off by the gate-off voltage.

The blank period may include a third period, which corresponds to the initialization period, and a fourth period. During the third period, which corresponds to a first initialization period, the scan signal, the scan sensing signal, and the emission signal may have the gate-off voltage and the scan bias signal may have the gate-on voltage. During the fourth period, the emission signal may have the gate-on voltage and the scan signal, the scan sensing signal, and the scan bias signal may have the gate-off voltage.

The blank period may include a third period, which corresponds to the initialization period, and a fourth period. During the third period, the scan signal and the scan sensing signal may have the gate-off voltage and the emission signal and the scan bias signal may have the gate-on voltage. During the fourth period, the emission signal may have the gate-on voltage and the scan signal, the scan sensing signal, and the scan bias signal may have the gate-off voltage.

A first sensing period during which a voltage of the first electrode of the first transistor may be sensed includes a first period, a second period, and a third period. During the first period, the scan signal and the scan sensing signal may have a gate-on voltage and the emission signal and the scan bias signal may have a gate-off voltage. During the second period, the scan sensing signal may have the gate-on voltage and the scan signal, the emission signal, and the scan bias signal may have the gate-off voltage. During the third period, the scan signal, the scan sensing signal, the emission signal, and the scan bias signal may have the gate-off voltage. The second, third, fourth, and fifth transistors may be turned on by the gate-on voltage and are turned off by the gate-off voltage.

A second sensing signal during which a voltage of the first electrodes of the light-emitting elements may be sensed includes a first period and a second period. During the first period, the scan bias signal may have a gate-on voltage and the scan signal, the scan sensing signal, the emission signal, and the scan bias signal may have a gate-off voltage. During the second period, the scan signal, the scan sensing signal, the emission signal, and the scan bias signal may have the gate-off voltage. The second, third, fourth, and fifth transistors may be turned on by the gate-on voltage and may be turned off by the gate-off voltage.

According to embodiments of the present disclosure, when digital video data is input in a variable frame frequency method that varies frame frequency, differences in length between frame periods may be generated depending on the frame frequency, but differences in luminance between the frame periods can be reduced or prevented by forcibly generating additional luminance valleys depending on the length of the frame periods.

It should be noted that the effects of the present disclosure are not limited to those described above, and other effects of the present disclosure will be apparent from the following description.

BRIEF DESCRIPTION OF DRAWINGS

FIG. 7 is a table showing the number of original luminance valleys, the number of luminance valleys additionally generated, and the total number of luminance valleys for each given frame frequency of a display device;

DETAILED DESCRIPTION

Figure 1:
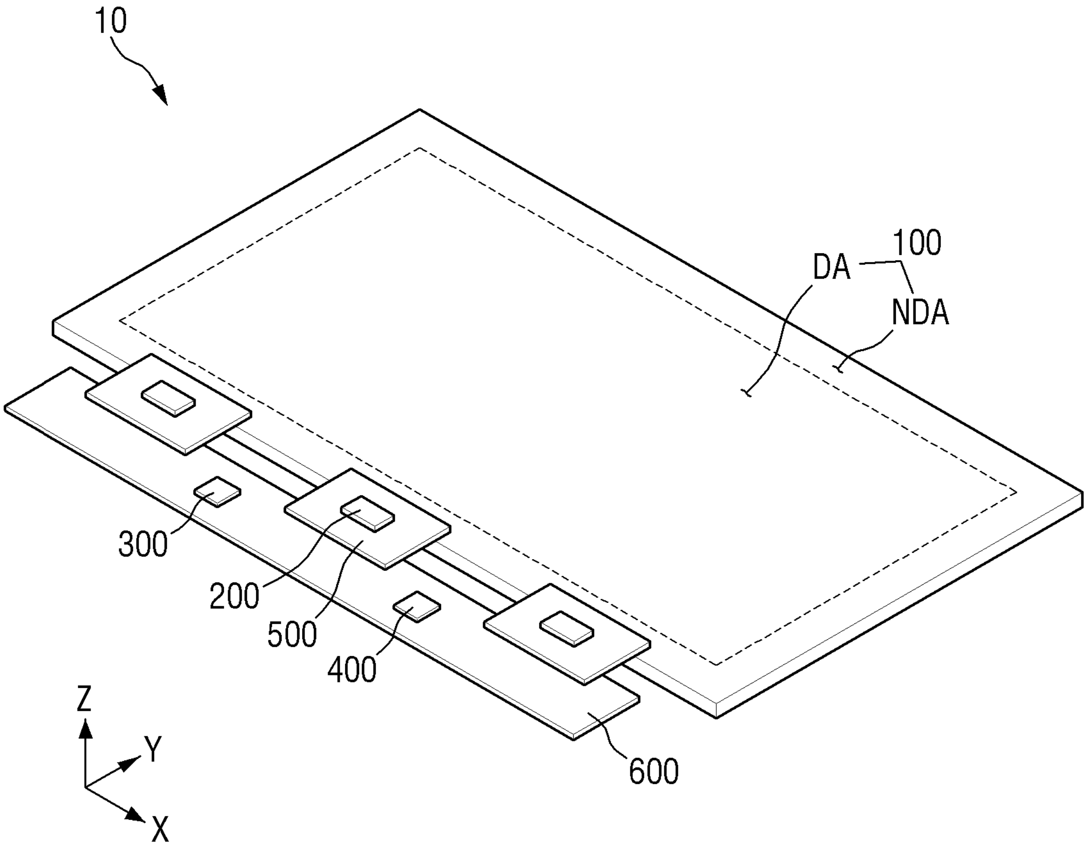
FIG. 1 is a perspective view of a display device according to one or more embodiments of the present disclosure.

Aspects and features of the present disclosure, and methods of achieving them, will become clear with reference to the detailed description of the following embodiments taken in conjunction with the accompanying drawings. However, the present disclosure is not limited to the embodiments disclosed below, but will be implemented in various different forms, only these embodiments make embodiments of the present disclosure complete, and are being provided to completely inform the scope of the invention to those of ordinary skill in the art to which the present disclosure belongs, and the spirit and scope of the present disclosure is defined by claims and their equivalents.

When an element or layer is referred to as being “on” another element or layer, it includes all cases where another element or layer is directly on top of another element or another layer or other element intervenes therebetween. Like reference numbers designate like elements throughout the specification. The shapes, sizes, ratios, angles, numbers, etc. disclosed in the drawings for explaining one or more embodiments are illustrative, and the present disclosure is not limited thereto.

Although first, second, etc. are used to describe various components, these components are not limited by these terms, of course. These terms are only used to distinguish one component from another. Accordingly, it goes without saying that the first element mentioned below may also be the second element within the technical spirit of the present disclosure.

Each feature of the various embodiments of the present disclosure can be partially or entirely combined or combined with each other, technically various interlocking and driving are possible, and each embodiment can be implemented independently of each other or can be implemented together in a related relationship.

Hereinafter, specific embodiments will be described with reference to the accompanying drawings.

FIG. 1 is a perspective view of a display device according to one or more embodiments of the present disclosure.

Referring to FIG. 1, a display device 10, which is a device displaying a moving or still image, may be used not only in a portable electronic device such as a mobile phone, a smartphone, a tablet personal computer (PC), a smartwatch, a watchphone, a mobile communication terminal, an electronic notepad, an electronic book, a portable multimedia player (PMP), a navigation device, and/or an ultramobile PC (UMPC), but also in various other products such as a television (TV), a notebook computer, a monitor, a billboard, and/or an Internet-of-Things (IoT) device.

The display device 10 includes a display panel 100, data drivers 200, a timing controller 300, a power supply unit 400, data circuit boards 500, and control circuit boards 600.

The display panel 100 may be formed in a rectangular shape having long sides in a first direction (or an X-axis direction) and short sides in a second direction (or a Y-axis direction) in a plan view. The corners where the long sides and the short sides of the display panel 100 meet may be rounded to have a suitable curvature (e.g., a predetermined curvature) or may be right-angled. The planar shape of the display panel 100 is not particularly limited, and the display panel 100 may be formed in various other shapes such as another polygonal shape, a circular shape, or an elliptical shape. The display panel 100 may be formed to be flat, but the present disclosure is not limited thereto. In one or more embodiments, the display panel 100 may include curved parts at both ends thereof, which have a uniform or varying curvature. The display panel 100 may be formed to be flexible such as foldable, bendable, and/or rollable.

The display panel 100 may include a display area DA, which displays an image, and a non-display area NDA, which is disposed around the display area DA along an edge or periphery of the display area. The display area DA may account for most of the display panel 100. The display area DA may be disposed in the middle of the display panel 100. Subpixels may be disposed in the display are DA to display an image.

Each of the subpixels may include light-emitting elements capable of emitting light such as organic light-emitting diodes (OLEDs), inorganic semiconductor elements, or micro-light-emitting diodes (micro-LEDs).

The non-display area NDA may be disposed adjacent to the display area DA. The non-display area NDA may be an area outside the display area DA. The non-display area NDA may be disposed to surround the display area DA. The non-display area NDA may be an edge area of the display panel 100.

Display pads, which are to be connected to the data circuit boards 500, may be disposed in the non-display area NDA. The display pads may be disposed on one side of the display panel 100. In one or more embodiments, the display pads DP may be disposed on the lower side of the display panel 100.

The data circuit boards 500 may be disposed on the display pads, which are disposed along one edge of the display panel 100. The data circuit boards 500 may be attached to the display pads via conductive adhesive members such as anisotropic conductive films (ACFs). As a result, the data circuit boards 500 may be electrically connected to the signal lines of the display panel 100. The display panel 100 may receive bias data voltages, gray data voltages, and driving voltages via the data circuit boards 500. The data circuit boards 500 may be flexible films such as flexible printed circuit boards (FPCBs), printed circuit boards (PCBs), and/or chip-on-films (COFs).

The data drivers 200 may generate the bias data voltages and the gray data voltages. The data drivers 200 may provide the bias data voltages and the gray data voltages to the display panel 100 via the data circuit boards 500.

The data drivers 200 may be formed as integrated circuits (ICs) and may be attached on the data circuit boards 500. Alternatively, the data drivers 200 may be attached on the display panel 100 in a chip-on-glass (COG) or chip-on-plastic (COP) manner or via ultrasonic bonding.

The control circuit boards 600 may be attached to the data circuit boards 500 via low-resistance, high-reliability materials such as ACFs or self-assembly anisotropic conductive paste (SAP). The control circuit boards 600 may be electrically connected to the data circuit boards 500. The control circuit boards 600 may be FPCBs or PCBs.

The timing controller 300 and the power supply unit 400 may be formed as ICs and may be attached on the control circuit boards 600. The timing controller 300 may provide digital video data to the data drivers 200. The power supply unit 400 may generate driving voltages for driving the subpixels of the display panel 100 and the data drivers 200 and may output the generated driving voltages.

Figure 2:
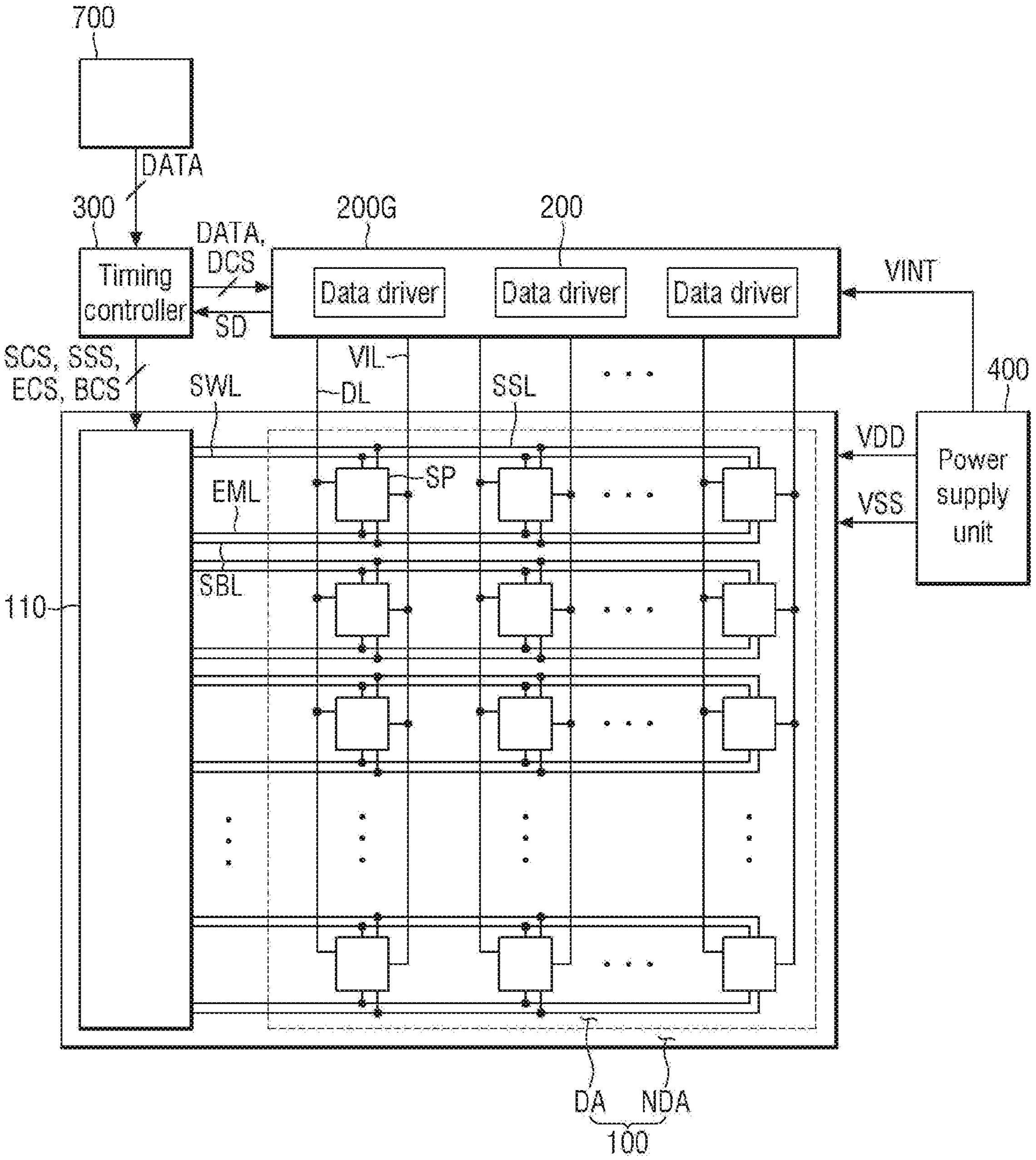
FIG. 2 is a block diagram of the display device according to one or more embodiments of the present disclosure.

FIG. 2 is a block diagram of a display device according to one or more embodiments of the present disclosure.

Referring to FIG. 2, the display device 10 includes the display panel 100, a scan driver 110, a data driver group 200G, which includes the data drivers 200, the timing controller 300, and the power supply unit 400.

Not only subpixels SP, but also scan lines SWL, scan sensing lines SSL, emission lines EML, scan bias lines SBL, data lines DL, sensing lines VIL, which are connected to the subpixels SP, may be disposed in the display area DA of the display panel 100.

The scan lines SWL, the scan sensing lines SSL, the emission lines EML, and the scan bias lines SBL may extend in a first direction (or an X-axis direction). The data lines DL, and the sensing lines VIL may extend in a second direction (or a Y-axis direction), which intersects the first direction (or the X-axis direction).

Each of the subpixels SP may be connected to one of the scan lines SWL, one of the scan sensing lines SSL, one of the emission lines EML, one of the scan bias lines SBL, one of the data lines DL, and one of the sensing lines VIL). The subpixels SP will be described later with reference to FIG. 5.

The scan driver 110, which applies scan signals to the scan lines SWL, scan sensing signals to the scan sensing lines SSL, emission signals to the emission lines EML, and scan bias signals to the scan bias lines SBL, may be disposed in the non-display area NDA of the display panel 100. FIG. 2 illustrates that the scan driver 110 is disposed on one side of the display panel 100, but the present disclosure is not limited thereto. Alternatively, the scan driver 110 may be disposed on both sides of the display panel 100.

The scan driver 110 may be connected to the timing controller 300. The scan drive 110 may receive scan control signals SCS, sensing control signals SSS, emission control signals ECS, and bias control signals BCS from the timing controller 300. The scan driver 110 may generate scan signals in accordance with the scan control signals SCS and output the scan signals to the scan lines SWL, and may generate scan sensing signals in accordance with the sensing control signals SSS and output to the scan sensing lines SSL. Also, the scan driver 110 may generate emission signals in accordance with the emission control signals ECS and output the emission signals to the emission lines EML, and may generate scan bias signals in accordance with the bias control signals BCS and output the scan bias signals to the scan bis lines SBL.

The data drivers 200 may convert digital video data DATA into data voltages and output the data voltages to the data lines DL. As the scan signals and the data voltages are provided in synchronization with one another, the subpixels SP may be selected by the scan signals from the scan driver 110, and the data voltages may be supplied to the selected subpixels SP.

The timing controller 300 receives the digital video data DATA and timing signals from an external graphics device 700. For example, the external graphics device 700 may be a graphics card of a computer, but the present disclosure is not limited thereto.

The timing controller 300 may generate the scan control signals SCS, the sensing control signals SSS, the emission control signals ECS, and the bias control signals BCS, which are for controlling the operation timing of the scan driver 110, and data control signals DCS, which are for controlling the operation timing of the data drivers 200, in accordance with timing signals.

The timing controller 300 receives sensing data SD from the data drivers 200 of the data driving group 200G. The sensing data SD is data obtained by sensing the characteristics of the driver transistor of each of the subpixels SP such as electron mobility or threshold voltage. The timing controller 300 may apply the sensing data SD to the digital video data DATA to compensate for the characteristics of the driver transistor of each of the subpixels SP. The sensing data SD may be stored in separate memories disposed in the control circuit boards 600.

The timing controller 300 outputs the scan control signals SCS, the sensing control signals SSS, the emission control signals ECS, and the bias control signals BCS to the scan driver 110. The timing controller 300 outputs the digital video data DATA and the data control signals DCS to the data drivers 200.

The power supply unit 400 may generate a plurality of driving voltages and output the driving voltages to the display panel 100 and the data drivers 200. The power supply unit 400 may output first and second driving voltages VDD and VSS to the display panel 100 and may output an initialization voltage VINT to the data drivers 200. The first driving voltage VDD may be a high-potential driving voltage for driving the light-emitting elements of each of the subpixels, the second driving voltage VSS may be a low-potential driving voltage for driving the light-emitting elements of each of the subpixels, and the initialization voltage VINT may be a voltage applied to the sensing lines VIL to initialize the first electrode of the driver transistor of each of the subpixels.

Figure 3:
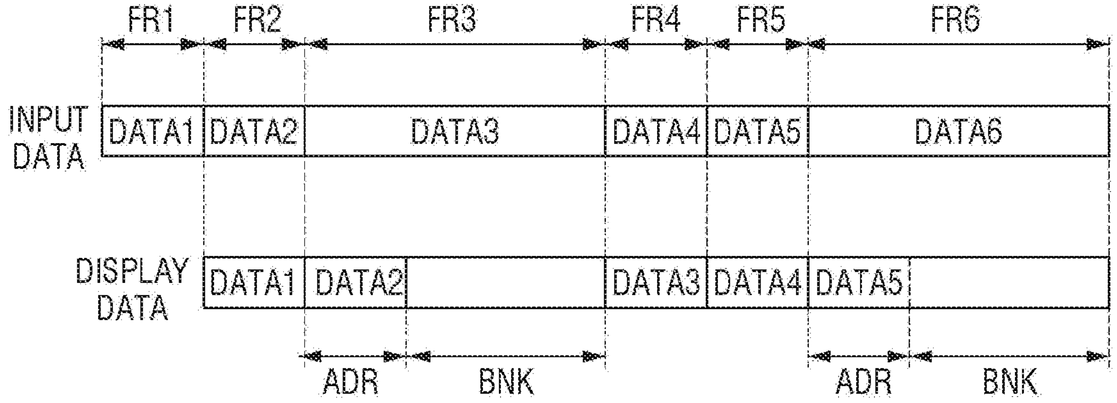
FIG. 3 is a timing diagram showing the input frame frequency of digital video data and the driving frame frequency of a display device according to one or more embodiments of the present disclosure.

FIG. 3 is a timing diagram showing the input frame frequency of digital video data and the driving frame frequency of a display device according to one or more embodiments of the present disclosure.

Referring to FIG. 3, "INPUT DATA" refers to digital video data input from the external graphics device 700, and "DISPLAY DATA" refers to digital video data used in the display device 10 to display an image.

The digital video data DATA input from the external graphics device 700 may have different frame frequencies for different frame periods. For example, the graphics device 700 may output the digital video data DATA at a frame frequency of 240 Hz during first, second, fourth, and fifth frame periods FR1, FR2, FR4, and FR5 and at a frame frequency of 80 Hz during third and sixth frame periods FR3 and FR6. In this example, the length of the third and sixth frame periods FR3 and FR6 may be about three times the length of the first, second, fourth, and fifth frame periods FR1, FR2, FR4, and FR5.

Specifically, the graphics device 700 may output first digital video data DATA1 at a frame frequency of 240 Hz during the first frame period FR1 and may output second digital video data DATA2 at a frame frequency of 240 Hz during the second frame period FR2. Also, the graphics device 700 may output third digital video data DATA3 at a frame frequency of 80 Hz during the third frame period FR3 and may output a fourth digital video data DATA4 at a frame frequency of 240 Hz during the fourth frame period FR4. Also, the graphics device 700 may output fifth digital video data DATA5 at a frame frequency of 240 Hz during the fifth frame period FR5 and may output sixth digital video data DATA6 at a frame frequency of 80 Hz during the sixth frame period FR6.

In an N-th period, the display device 10 displays an image in accordance with digital video data DATA in an (N−1)-th frame period. For example, in the second frame period FR2, the display device 10 displays an image in accordance with the first digital video data DATA1 input from the graphics device 700 in the first frame period FR1.

Specifically, the timing controller 300 of the display device 10 displays an image in accordance with the first digital video data DATA1 during the second frame period FR2 and controls an image to be displayed in accordance with the second digital video data DATA2 during the third frame period FR3. The timing controller 300 of the display device 10 displays an image in accordance with the third digital video data DATA3 during the fourth frame period FR4 and controls an image to be displayed in accordance with the fourth digital video data DATA4 during the fifth frame period FR5. The timing controller 300 of the display device 10 controls an image to be displayed in accordance with the fifth digital video data DATA5 during the sixth frame period FR6.

That is, the data drivers 200 may convert the first digital video data DATA1 into data voltages and output the data voltages to the data lines DL of the display panel 100 during the second frame period FR2, and may convert the second digital video data DATA2 into data voltages and may output the data voltages to the data lines DL during the third frame period FR3. The display device 10 may convert the third digital video data DATA3 into data voltages and output the data voltages to the data lines DL of the display panel 100 during the fourth frame period FR4, and may convert the fourth digital video data DATA4 into data voltages and may output the data voltages to the data lines DL during the fifth frame period FR5. The display device 10 may convert the fifth digital video data DATA5 into data voltages and may output the data voltages to the data lines DL of the display panel 100 during the sixth frame period FR6.

The display device 10 displays an image at a maximum frame frequency regardless of the length of the first through sixth frame periods FR1 through FR6. For example, when the maximum frame frequency of the display device 10 is 240 Hz, the display device 10 displays an image at a frame frequency of 240 Hz during each of the first through sixth frame periods FR1 through FR6. In this example, each of the third and sixth frame periods FR3 and FR6, which are driven at a frame frequency of 80 Hz, may include a data addressing period ADR and a blank period BNK. The data addressing period ADR may be a period when data voltages are supplied to the subpixels SP. The length of the data addressing period ADR may be substantially the same as the length of frame periods that are driven at the maximum frame period. That is, the length of the data addressing period ADR may be substantially the same as the length of the first, second, fourth, and fifth frame periods FR1, FR2, FR4, and FR5. The blank period BNK is a period when no data voltages are supplied to the subpixels SP. The blank period BNK may be substantially the same as or longer than the data addressing period ADR.

As shown in FIG. 3, as the external graphics device 700 outputs the digital video data DATA in a variable frame frequency method that varies the frame frequency of the display device to respond to a rapid screen switching when implementing a gaming display, the driving frame frequency of the display device 10 can be synchronized with the input frame frequency of the digital video data DATA. As a result, degradation of the quality of an image that may be caused by a mismatch between the driving frame frequency of the display device 10 and the input frame frequency of the digital video data DATA can be prevented.

Also, the lower the frame frequency for each frame period, the longer the blank period BNK of each frame period. In this case, the luminance of an image displayed by the display device 10 during a frame period driven at a low frame frequency may differ from the luminance of an image displayed by the display device 10 during a frame period driven at a high frame frequency. The luminance of an image displayed by the display device 10 in accordance with frame frequency will hereinafter be described with reference to FIG. 4.

Figure 4:
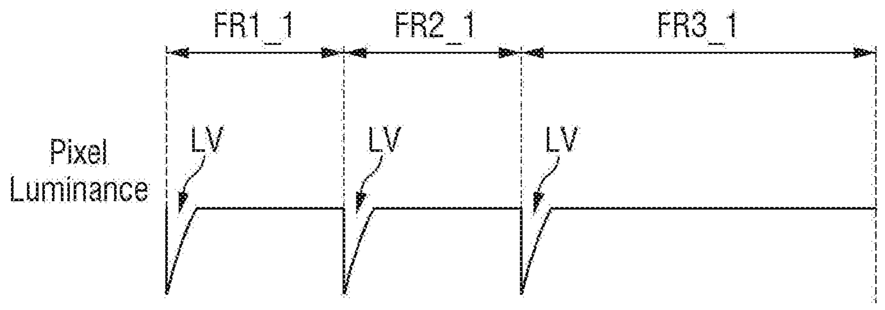
FIG. 4 is a timing diagram showing the luminance of each subpixel when the driving frame frequency of a display device is 60 Hz or 120 Hz.

FIG. 4 is a timing diagram showing the luminance of each subpixel when the driving frame frequency of a display device is 60 Hz or 120 Hz.

FIG. 4 shows that first and second frame periods FR1_1 and FR2_1 of the display device 10 are frame periods corresponding to a frame frequency of 120 Hz and a third frame period FR3_1 is a frame period corresponding to a frame frequency of 60 Hz.

Referring to FIG. 4, as the subpixels SP do not emit light when being supplied with data voltages, the luminance of the subpixels SP may have a single luminance valley LV during each of the first, second, and third frame periods FR1_1, FR2_1, and FR3_1. Here, the luminance valley LV refers to a V-shaped luminance curve produced due to the subpixels SP not emitting light when not being supplied with data voltages.

As the first and second frame periods FR1_1 and FR2_1 are frame periods corresponding to a frame frequency of 120 Hz and the third frame period FR3_1 is a frame period corresponding to a frame frequency of 60 Hz, the length of the third frame period FR3_1 may be about two times the length of the first and second frame periods FR1_1 and FR2_1. For example, the sum of the lengths of the first and second frame periods FR1_1 and FR2_1 may be substantially the same as the third frame period FR3_1.

In each of the first, second, and third frame periods FR1_1, FR2_1, and FR3_1, one luminance valley LV exists. That is, there are two luminance valleys LV in the first and second frame periods FR1_1 and FR2_1, and there is one luminance valley LV in the third frame period FR3_1. Thus, the luminance of the subpixels SP during the first and second frame periods FR1_1 and FR2_1 may be lower than the luminance of the subpixels SP during the third frame period FR3_1. Particularly, when the subpixels SP display a low gradation image, the ratio of the difference between the luminance of the subpixels SP during the first and second frame periods FR1_1 and FR2_1 and the luminance of the subpixels SP during the third frame period FR3_1 to the luminance of the subpixels SP during the first and second frame periods FR1_1 and FR2_1 may increase. Accordingly, when the digital video data DATA is received in a variable frame frequency method that varies frame frequency, there is a need to reduce or prevent any difference in the luminance of the subpixels SP between different frame periods.

Figure 5:
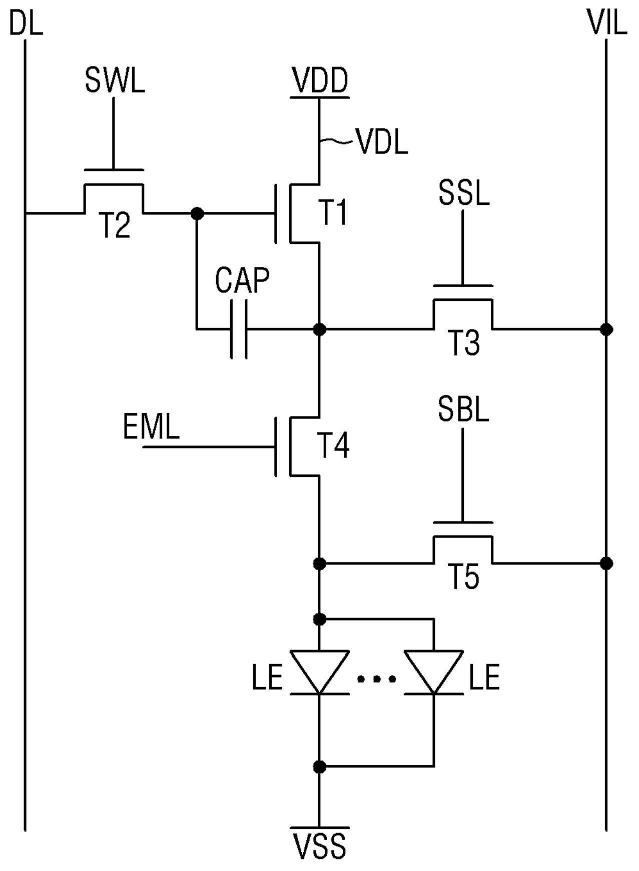
FIG. 5 is a circuit diagram of a subpixel according to one or more embodiments of the present disclosure.

FIG. 5 is a circuit diagram of a subpixel according to one or more embodiments of the present disclosure.

Referring to FIG. 5, a subpixel SP includes light-emitting elements LE, a first transistor T1, a second transistor T2, a third transistor T3, a fourth transistor T4, a fifth transistor T5, and a capacitor CAP.

Each of the light-emitting elements LE emits light in response to a driving current supplied thereto via the first transistor T1. The light-emitting elements LE may be OLEDs, inorganic light-emitting diodes, or micro-light-emitting diodes. The light-emitting elements LE may be connected to a second power line, to which first electrodes of the light-emitting elements LE are connected and a second power supply voltage VSS is applied. That is, the light-emitting elements LE may be connected in parallel between a first electrode of the first transistor T1 and the second power line.

The first transistor T1 may be a driver transistor controlling a current that flows from a first power line VDL, to which a first power supply voltage is supplied in accordance with the difference in voltage between gate and source electrodes of the first transistor T1, into the light-emitting elements LE. The gate electrode of the first transistor T1 may be connected to a first electrode of the second transistor T2, the source electrode of the first transistor T1 may be connected to anodes of the light-emitting elements LE, and a drain electrode of the first transistor T1 may be connected to a first power line VDL, to which a high-potential voltage VDD is applied.

The second transistor T2 is turned on by a scan signal from a scan line SWL to connect a data line DL to the gate electrode of the first transistor T1. A gate electrode of the second transistor T2 may be connected to the scan line SWL, the first electrode of the second transistor T2 may be connected to the gate electrode of the first transistor T1, and a second electrode of the second transistor T2 may be connected to the data line DL.

The third transistor T3 is turned on by a scan sensing signal from a scan sensing line SSL to connect a sensing line VIL to the first electrode of the first transistor T1. A gate electrode of the third transistor T3 may be connected to the scan sensing line SSL, a first electrode of the third transistor T3 may be connected to the sensing line VIL, and a second electrode of the third transistor T3 may be connected to the first electrode of the first transistor T1.

The fourth transistor T4 is turned on by an emission signal from an emission line EML to connect the first electrode of the first transistor T1 to the first electrodes of the light-emitting elements LE. A gate electrode of the fourth transistor T4 may be connected to the emission line EML, a first electrode of the fourth transistor T4 may be connected to the first electrodes of the light-emitting elements LE, and a second electrode of the fourth transistor T4 may be connected to the first electrode of the first transistor T1.

The fifth transistor T5 is turned on by a scan bias signal from a scan bias line SBL to connect the sensing line VIL to the first electrodes of the light-emitting elements LE. A gate electrode of the fifth transistor T5 may be connected to the scan bias line SBL, a first electrode of the fifth transistor T5 may be connected to the sensing line VIL, and a second electrode of the fifth transistor T5 may be connected to the first electrodes of the light-emitting elements LE.

The capacitor CAP is formed between the gate electrode and the first electrode of the first transistor T1. The capacitor CAP stores a difference in voltage between the gate electrode and the first electrode of the first transistor T1.

One of the first and second electrodes of each of the first, second, third, fourth, and fifth transistors T1, T2, T3, T4, and T5 may be a source electrode, and the other electrode may be a drain electrode. The first, second, third, fourth, and fifth transistors T1, T2, T3, T4, and T5 may be formed as thin-film transistors (TFTs).

FIG. 5 illustrates that the first, second, third, fourth, and fifth transistors T1, T2, T3, T4, and T5 are N-type metal-oxide semiconductor field-effect transistors (MOSFETs), but the present disclosure is not limited thereto. Alternatively, the first, second, third, fourth, and fifth transistors T1, T2, T3, T4, and T5 may be formed as P-type MOSFETs, in which case, the timing diagrams of FIGS. 6, 8, 11, 14, 17, and 19 may be appropriately modified in accordance with the characteristics of P-type MOSFETs.

Figure 6:
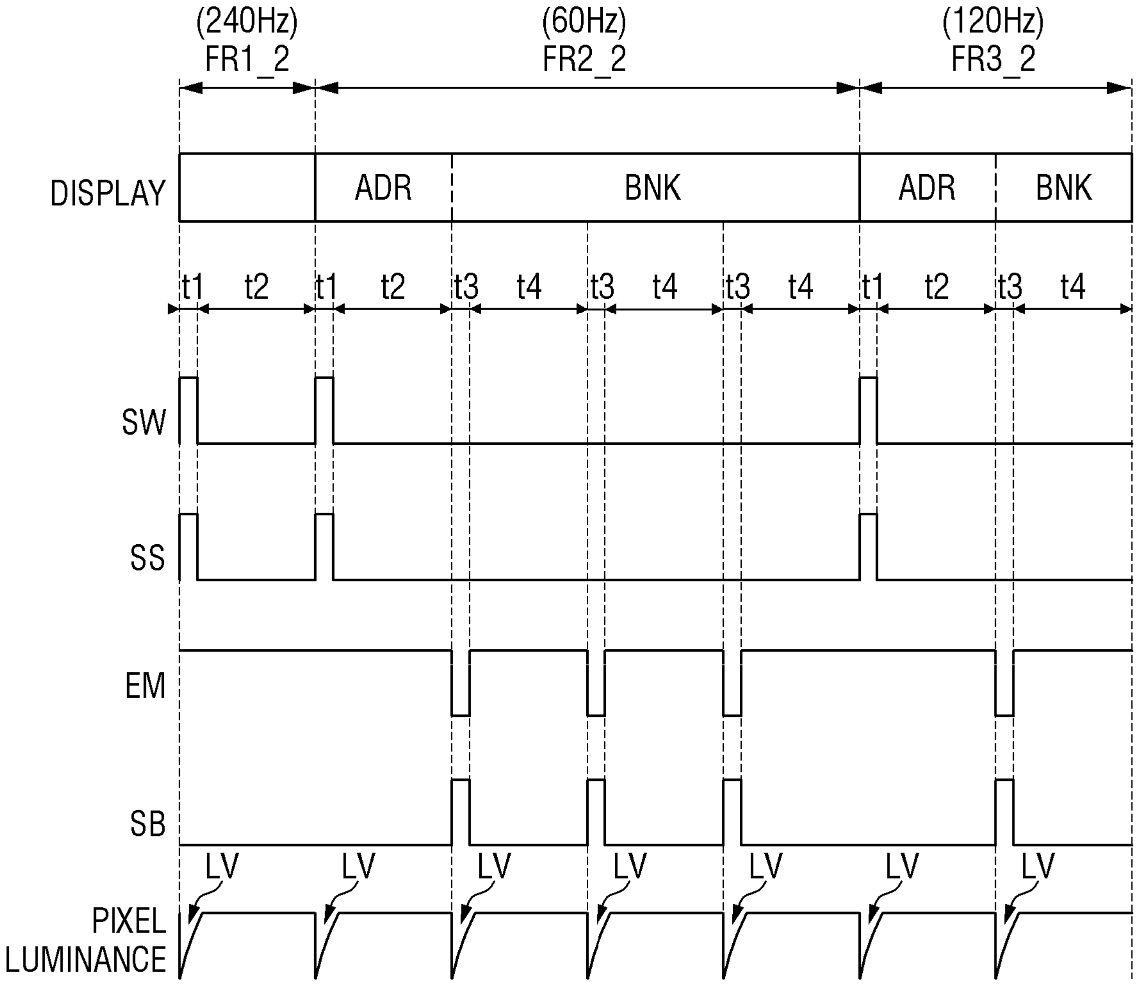
FIG. 6 is a timing diagram showing a scan signal, a sensing signal, a scan bias signal, and an emission signal applied to the subpixel of FIG. 5 and luminance valleys (LV) when the driving frame frequency of a display device is 60 Hz or 240 Hz.

FIG. 6 is a timing diagram showing a scan signal, a sensing signal, a scan bias signal, and an emission signal applied to the subpixel of FIG. 5 and luminance valleys when the driving frame frequency of a display device is 60 Hz or 240 Hz.

FIG. 6 shows that a first frame period FR1_2 is a frame period when the frame frequency of the display device 10 is 240 Hz, a second frame period FR2_2 is a frame period when the frame frequency of the display device 10 is 60 Hz, and a third frame period FR3_2 is a frame period when the frame frequency of the display device 10 is 120 Hz.

Referring to FIG. 6, the length of the second frame period FR2_2 is about four times the length of the first frame period FR1_2. Also, the length of the second frame period FR2_2 is about two times the length of the third frame period FR3_2. Also, the length of the third frame period FR3_2 is about two times the length of the first frame period FR1_2. The length of a data addressing period ADR of the second frame period FR2_2 may be substantially the same as the length of a data addressing period ADR of the third frame period FR3_2. Also, the length of the data addressing period ADR of the second frame period FR2_2 may be substantially the same as the length of the first frame period FR1_2.

The length of a blank period BNK of the second frame period FR2_2 may be greater than the length of a blank period BNK of the third frame period FR3_2. The length of the data addressing period ADR of the third frame period FR3_2 may be substantially the same as the length of the blank period BNK of the third frame period FR3_2. The length of the blank period BNK of the second frame period FR2_2 may be greater than the length of the first frame period FR1_2.

As the subpixel SP does not emit light when being supplied with a data voltage, the luminance of the subpixel SP has a luminance valley LV in each of the first, second, and third frame periods FR1_2, FR2_2, and FR3_2 when a scan signal SW with a gate-on voltage Von is being applied to the subpixel SP. Also, as the second frame period FR2_2 is about four times longer the first frame period FR1_2, the luminance of the subpixel SP has three additional luminance valleys LV in the second frame period FR2_2. Also, as the third frame period FR3_2 is about two times longer the first frame period FR1_2, the luminance of the subpixel SP also has an additional luminance valleys LV in the third frame period FR3_2.

Additional luminance valleys LV may be generated by initializing the voltage of the first electrodes of the light-emitting elements LE to an initialization voltage VINT. Additional luminance valleys LV may be generated when a scan bias signal SB with the gate-on voltage Von is being applied. That is, a third period t3 of FIG. 6 may be an initialization period. First through fourth periods of FIG. 6 will be described later with reference to FIGS. 8 and 11.

As shown in FIG. 6, in a case where the digital video data DATA is received in a variable frame frequency method that varies frame frequency, the length of each frame period may vary depending on the frame frequency, but any difference in the luminance of the subpixel SP between different frame periods can be reduced or prevented by forcibly generating additional luminance valleys LV depending on the length of each frame period.

Also, the number of luminance valleys LV may be dependent upon the length of each frame period. That is, the greater the length of each frame period, the greater the number of luminance valleys LV. The lower the frame frequency, the greater the length of each frame period. The number of luminance valleys for each given frame period will be described later with reference to FIG. 7.

FIG. 7 is a table showing the number of original luminance valleys, the number of luminance valleys additionally generated, and the total number of luminance valleys for each given frame frequency of a display device.

Referring to FIG. 7, original luminance valleys LV refer to luminance valleys LV generated when a data voltage is being supplied. The original luminance valleys LV may be generated when the scan signal SW with the gate-on voltage Von is being applied.

Additional luminance valleys LV refer to luminance valleys LV generated by initializing the voltage of the first electrodes of the light-emitting elements LE to the initialization voltage VINT. The additional luminance valleys LV may be generated when the scan bias signal SB with the gate-on voltage Von is being applied.

The total number of luminance valleys refers to the sum of the numbers of original luminance valleys LV and additional luminance valleys LV. FIG. 7 shows that the maximum frame frequency of the display device 10 is 240 Hz. A frame period corresponding to the maximum frame frequency of 240 Hz does not include a blank period, and thus, no additional luminance valleys LV need to be generated.

As the length of a frame period corresponding to a frame frequency of 120 Hz is about two times the length of the frame period corresponding to the maximum frame period, one additional luminance valley LV may be generated. In one or more embodiments, a frame period corresponding to a frame frequency greater than 120 Hz and less than 240 Hz, may include a blank period BNK. However, the length of the frame period corresponding to a frame frequency greater than 120 Hz and less than 240 Hz is less than two times the frame period corresponding to the maximum frame frequency. That is, as the length of the blank period BNK of the frame period corresponding to a frame frequency greater than 120 Hz and less than 240 Hz is less than the length of a data addressing period ADR of the frame period corresponding to a frame frequency greater than 120 Hz and less than 240 Hz, no additional luminance valleys LV may be generated.

As the length of a frame corresponding to a frame frequency of 80 Hz is about three times the length of the frame period corresponding to the maximum frame frequency, two additional luminance valleys LV may be generated. A frame period corresponding to a frame frequency greater than 80 Hz and less than 120 Hz may include a blank period BNK. However, the length of the frame period corresponding to a frame frequency greater than 80 Hz and less than 120 Hz may be greater than two times the length of the frame period corresponding to the maximum frame frequency and less than three times the length of the frame period corresponding to the maximum frame frequency. That is, as the length of the blank period BNK of the frame period corresponding to a frame frequency greater than 80 Hz and less than 120 Hz is less than two times the length of a data addressing period ADR of the frame period corresponding to a frame frequency greater than 80 Hz and less than 120 Hz, one additional luminance valley LV may be generated.

As the length of a frame period corresponding to a frame frequency of 60 Hz is about four times the length of the frame period corresponding to the maximum frame frequency, three additional valleys LV may be generated. In one or more embodiments, a frame frequency greater than 60 Hz and less than 80 Hz may include a blank period BNK. However, the length of the frame frequency greater than 60 Hz and less than 80 Hz is greater than three times the length of the frame period corresponding to the maximum frame frequency and less than four times the length of the frame period corresponding to the maximum frame frequency. That is, as the length of the blank period BNK of the frame frequency greater than 60 Hz and less than 80 Hz is less than three times the length of a data addressing period ADR of the frame frequency greater than 60 Hz and less than 80 Hz, two additional luminance valleys LV may be generated.

As already mentioned above, the number of additional luminance valleys for each given frame period may be calculated by discarding the decimal part of a frame frequency multiple calculated by Equation 1 below.

$$FRM = \frac{\mathrm{MAX}\,FR}{CURFR} \qquad \text{Equation 1}$$

Referring to Equation 1, FRM denotes a frame frequency multiple, MAXFR denotes a maximum frame frequency, and CURFR denotes the frame frequency of a current frame period.

Figure 8:
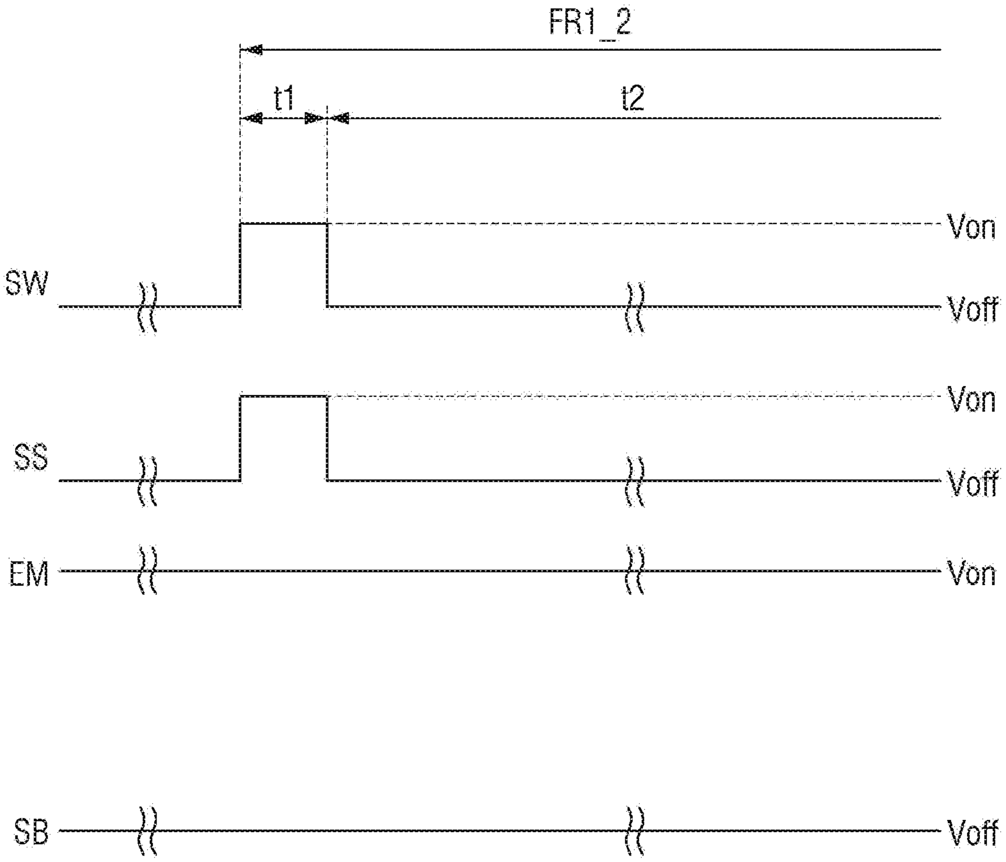
FIG. 8 is a timing diagram showing a scan signal, a sensing signal, a scan bias signal, and an emission signal applied to the subpixel of FIG. 5 during a first frame period.

FIG. 8 is a timing diagram showing a scan signal, a sensing signal, a scan bias signal, and an emission signal applied to the subpixel of FIG. 5 during a first frame period. FIG. 8 shows the first frame period FR1_2 of FIG. 6, which is driven at a maximum frame frequency of 240 Hz.

Referring to FIG. 8, the first frame period FR1_2 may include first and second periods t1 and t2. The first period t1 is a period when a data voltage Vdata is supplied to the gate electrode of the first transistor T1 to initialize the first electrode of the first transistor T1 to the initialization voltage VINT. The second period t2 is a period when the light-emitting elements LE emit light in accordance with a current Ids of the first transistor T1.

The scan signal SW from the scan line SWL and the sensing signal SS from the scan sensing line SSL have the gate-on voltage Von during the first period t1 and have a gate-off voltage Voff during the second period t2. The emission signal EM from the emission line EML has the gate-on voltage Von during the first and second periods t1 and t2. The scan bias signal SB from the scan bias line SBL has the gate-off voltage Voff during the first and second periods t1 and t2.

The gate-on voltage Von is a voltage for turning on the second, third, fourth, and fifth transistors T2, T3, T4, and T5. The gate-off voltage Voff is a voltage for turning off the second, third, fourth, and fifth transistors T2, T3, T4, and T5. In a case where the second, third, fourth, and fifth transistors T2, T3, T4, and T5 are N-type MOSFETs, the gate-on voltage Von may be 10 V or higher, and the gate-off voltage Voff may be 0 V or lower.

Figure 9:
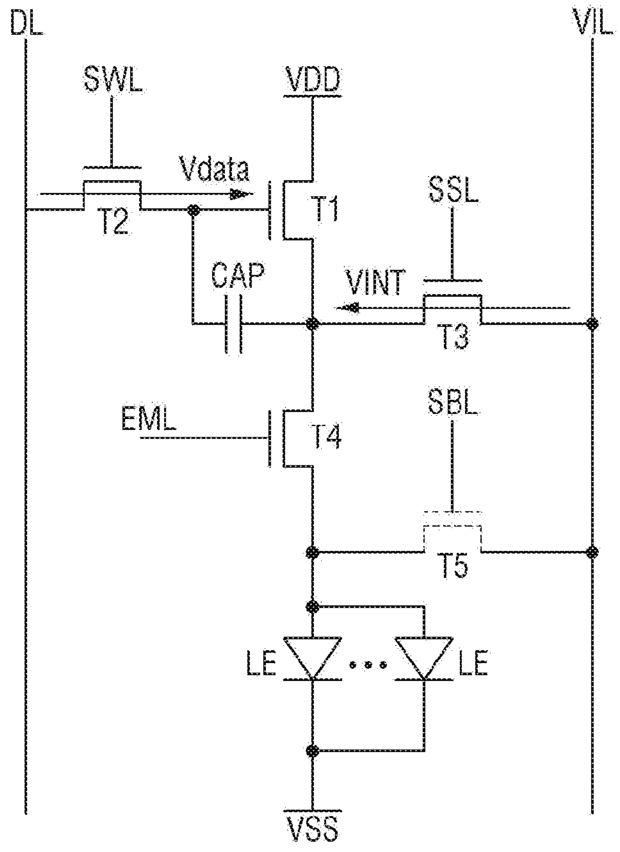
FIGS. 9 and 10 are circuit diagrams illustrating operations of a subpixel during a first period.
Figure 10:
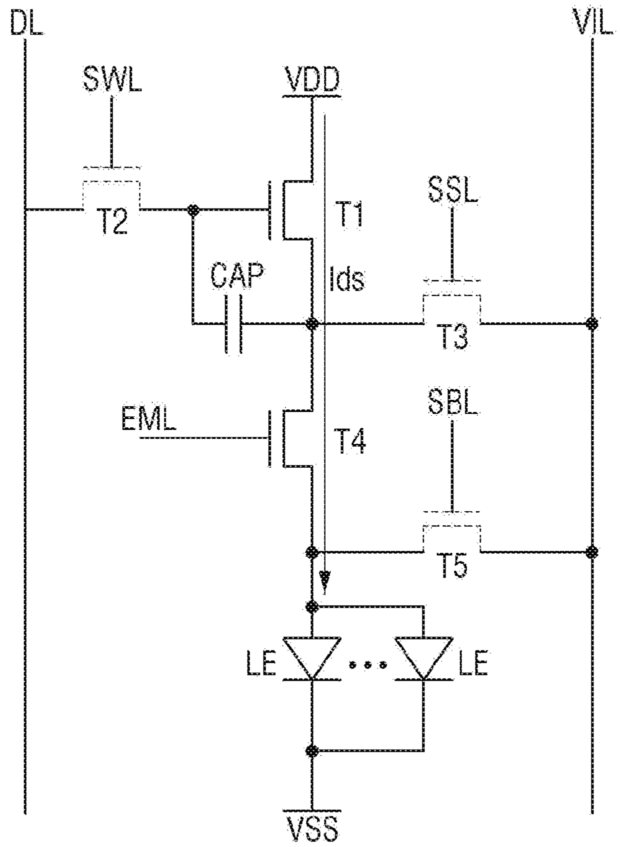

FIGS. 9 and 10 are circuit diagrams illustrating operations of a subpixel during a first period.

Operations of a subpixel SP during the first and second periods t1 and t2 of the first frame period FR1_2 will hereinafter be described with reference to FIGS. 8 through 10.

First, referring to FIG. 9, during the first period t1, a second transistor T2 is turned on by a scan signal SW with the gate-on voltage Von, which is applied to a scan line SWL. During the first period t1, a third transistor T3 is turned on by a scan sensing signal SS with the gate-on voltage Von, which is applied to a scan sensing line SSL. During the first period t1, a fourth transistor T4 is turned on by an emission signal EM with the gate-on voltage Von, which is applied to an emission line EML. During the first period, a fifth transistor T5 is turned off by a scan bias signal SB with the gate-off voltage Voff, which is applied to a scan bias line SBL.

During the first period t1, as the second transistor T2 is turned on, a data voltage Vdata from a data line DL is applied to a gate electrode of the first transistor T1. During the first period t1, as the third transistor T3 is turned on, the initialization voltage VINT from a sensing line VIL is applied to a first electrode of the first transistor T1. During the first period t1, as the fourth transistor T4 is turned on, the initialization voltage VINT from the sensing line VIL is applied to first electrodes of light-emitting elements LE.

Second, referring to FIG. 10, during the second period t2, the second transistor T2 is turned off by a scan signal SW with the gate-off voltage Voff, which is applied to the scan line SWL. During the second period t2, the third transistor T3 is turned off by a scan sensing signal SS with the gate-off voltage Voff, which is applied to the scan sensing line SSL. During the second period t2, the fourth transistor T4 is turned on by the emission signal EM with the gate-on voltage Von, which is applied to the emission line EML. During the second period t2, the fifth transistor T5 is turned off by a scan bias signal SB with the gate-off voltage Voff, which is applied to the scan bias line SBL.

During the second period t2, a driving current Ids flows in accordance with the difference between a voltage Vg of the gate electrode of the first transistor T1 and a voltage Vs of the first electrode of the first transistor T1. During the second period t2, as the fourth transistor T4 is turned on, the driving current Ids may flow into the light-emitting elements LE. Thus, during the second period t2, the light-emitting elements LE may emit light in accordance with the driving current Ids.

Figure 11:
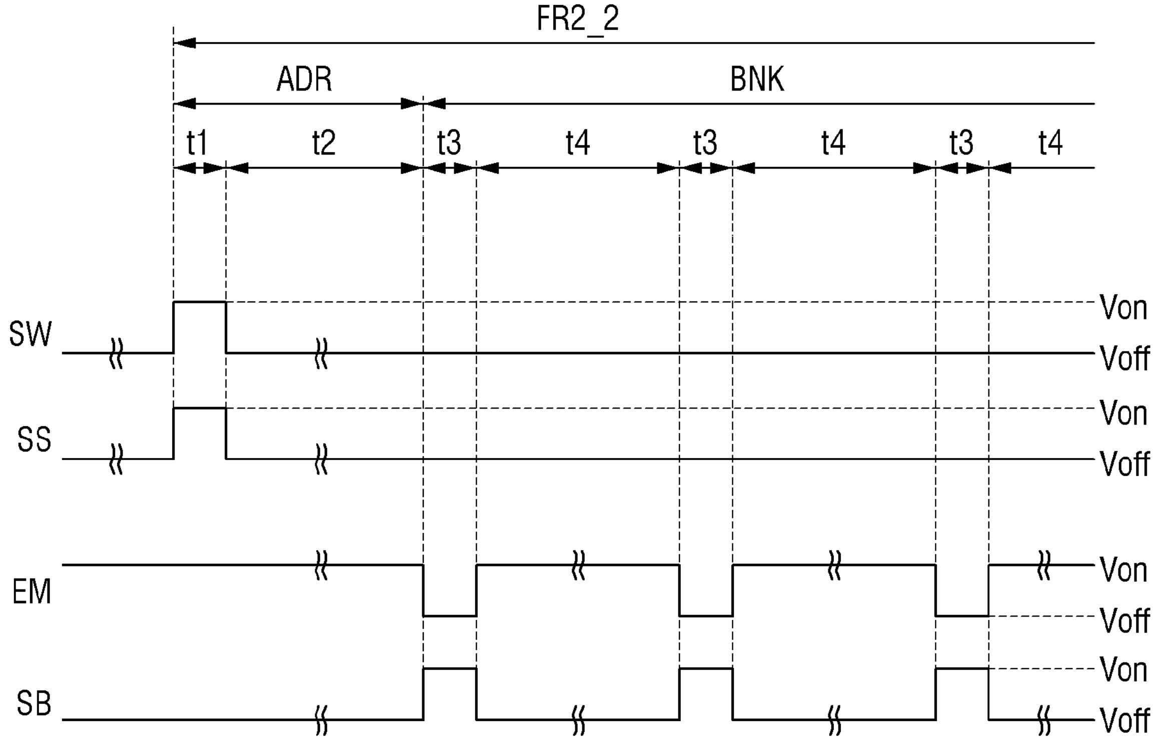
FIG. 11 is a timing diagram showing a scan signal, a sensing signal, a scan bias signal, and an emission signal applied to the subpixel of FIG. 5 during a second frame period.

FIG. 11 is a timing diagram showing a scan signal, a sensing signal, a scan bias signal, and an emission signal applied to the subpixel of FIG. 5 during a second frame period. FIG. 11 shows the second frame period FR2_2 of FIG. 6, which is driven at a frame frequency of 60 Hz.

Referring to FIG. 11, the second frame period FR2_2 may include a data addressing period ADR and a blank period BNK. The data addressing period ADR may include first and second periods t1 and t2. The blank period BNK may include at least one third period t3 and at least one fourth period t4. For example, in a case where the blank period BNK includes three third periods t3 and three fourth periods t4, the three third periods t3 and the three fourth periods t4 may be arranged in the blank period BNK in the order of a third period t3, a fourth period t4, a third period t3, a fourth period t4, a third period t3, and a fourth period t4.

The first period t1 is a period when a data voltage Vdata is supplied to the gate electrode of the first transistor T1 and the first electrode of the first transistor T1 is initialized to the initialization voltage VINT. The second period t2 is a period when the light-emitting elements LE emit light in accordance with the current Ids of the first transistor T1. The third period t3 are periods in which the first electrodes of the light-emitting elements LE are initialized. The fourth periods t4 are periods when the light-emitting elements LE emit light in accordance with the current Ids of the first transistor T1.

The scan signal SW from the scan line SWL and the sensing signal SS from the scan sensing line SSL have the gate-on voltage Von during the first period t1 and have the gate-off voltage Voff during the second period t2, the third periods t3, and the fourth periods t4. The emission signal EM from the emission line EML has the gate-on voltage Von during the first period t1, the second period t2, and the fourth periods t4 and has the gate-off voltage Voff during the third periods t3. The scan bias signal SB from the scan bias line SBL has the gate-on voltage Von during the third periods t3 and has the gate-off voltage Voff during the first period t1, the second period t2, and the fourth periods t4.

Figure 12:
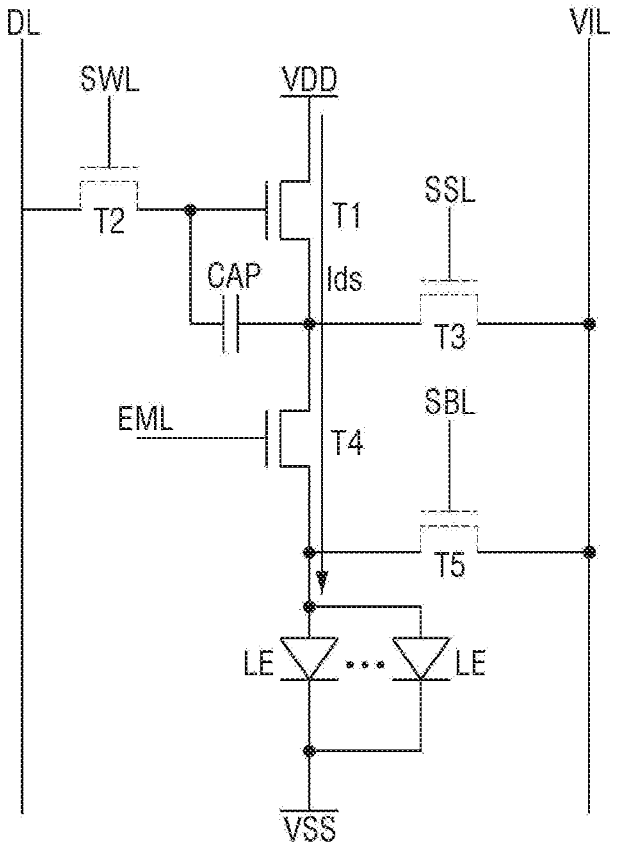
FIGS. 12 and 13 are circuit diagrams illustrating operations of a subpixel during the second period of FIG. 11.
Figure 13:
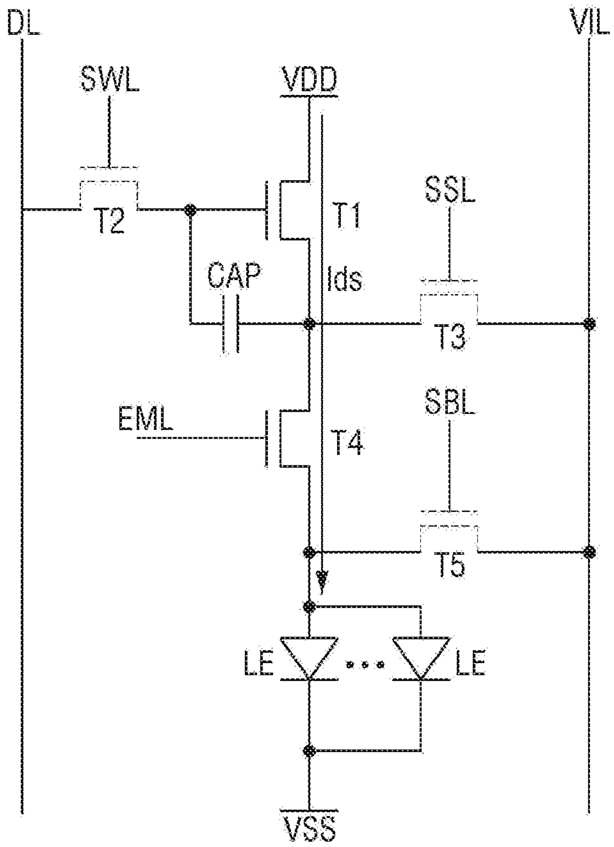

FIGS. 12 and 13 are circuit diagrams illustrating operations of a subpixel during the second period of FIG. 11.

Operations of the subpixel SP during the first and second periods t1 and t2 of the data addressing period ADR of the second frame period FR2_2 are substantially the same as described above with reference to FIGS. 8 through 10, and thus, detailed descriptions thereof will be omitted.

Operations of the subpixel SP during the third periods t3 and the fourth periods t4 of the blank period BNK of the second frame period FR2_2 will hereinafter be described with reference to FIGS. 11 through 13.

First, referring to FIG. 12, during the third periods t3, the second transistor T2 is turned off by the scan signal SW with the gate-off voltage Voff, which is applied to the scan line SWL. During the third periods t3, the third transistor T3 is turned off by the scan sensing signal SS with the gate-off voltage Voff, which is applied to the scan sensing line SSL. During the third period t3, the fourth transistor T4 is turned off by the emission signal EM with the gate-off voltage Voff, which is applied to the emission line EML. During the third period t3, the fifth transistor T5 is turned on by the scan bias signal SB with the gate-on voltage Von, which is applied to the scan bias line SBL.

During the third periods t3, as the fifth transistor T5 is turned on, the initialization voltage VINT from the sensing line VIL is applied to the first electrodes of the light-emitting elements LE. The initialization voltage VINT may be lower than the sum of the second power supply voltage VSS and the threshold voltage of the light-emitting elements LE. For example, the initialization voltage VINT may be substantially the same as or lower than the second power supply voltage VSS. Thus, during the third periods t3, the light-emitting elements LE may not emit light. Accordingly, luminance valleys LV may be forcibly generated during the third periods t3.

Referring to FIG. 13, during the fourth periods t4, the second transistor T2 is turned off by the scan signal SW with the gate-off voltage Voff, which is applied to the scan line SWL. During the fourth periods t4, the third transistor T3 is turned off by the scan sensing signal SS with the gate-off voltage Voff, which is applied to the scan sensing line SSL. During the fourth periods t4, the fourth transistor T4 is turned on by the emission signal EM with the gate-on voltage Von, which is applied to the emission line EML. During the fourth periods t4, the fifth transistor T5 is turned off by the scan bias signal SB with the gate-off voltage Voff, which is applied to the scan bias line SBL.

During the fourth periods t4, the driving current Ids flows in accordance with the difference between the voltage Vg of the gate electrode of the first transistor T1 and the voltage Vs of the first electrode of the first transistor T1. During the fourth periods t4, as the fourth transistor T4 is turned on, the driving current Ids flows into the light-emitting elements LE. Accordingly, during the fourth periods t4, the light-emitting elements LE may emit light in accordance with the driving current Ids.

Figure 14:
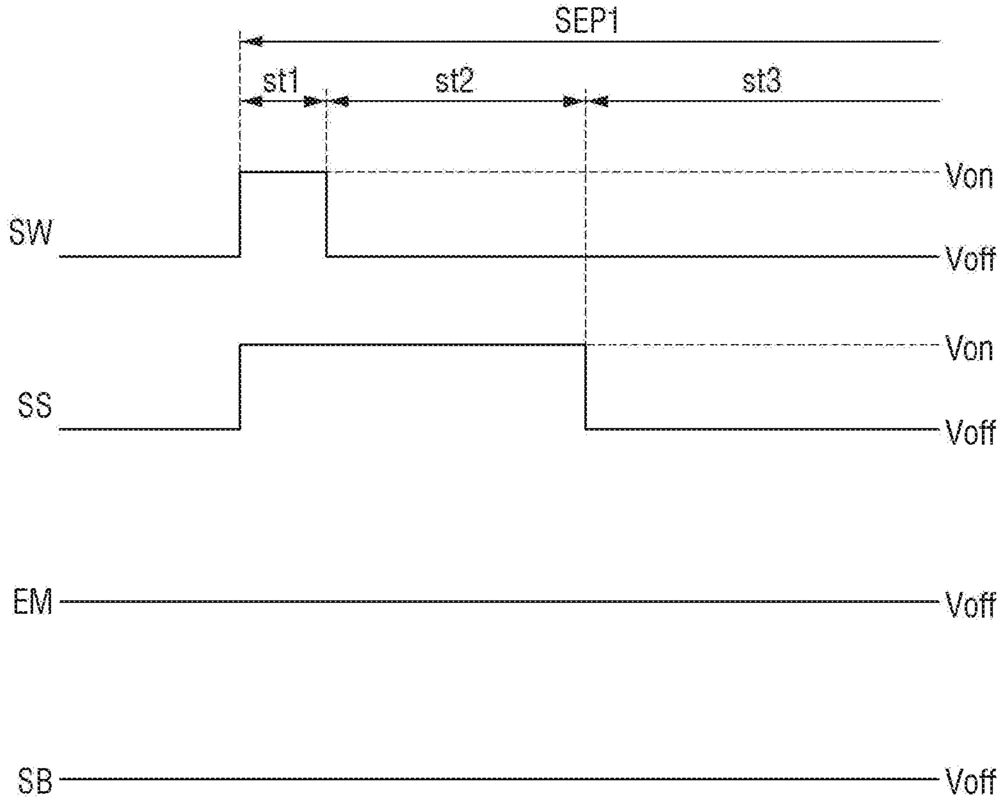
FIG. 14 is a timing diagram showing a scan signal, a sensing signal, a scan bias signal, and an emission signal applied to the subpixel of FIG. 5 during a first sensing period.

FIG. 14 is a timing diagram showing a scan signal, a sensing signal, a scan bias signal, and an emission signal applied to the subpixel of FIG. 5 during a first sensing period.

Referring to FIG. 14, a first sensing period SEP1 may be a period for sensing the threshold voltage of the first transistor T1 of the subpixel SP. The first sensing period SEP1 may include first, second, and third periods st1, st2, and st3.

The first period st1 is a period when the data voltage Vdata is supplied to the gate electrode of the first transistor T1 and the first electrode of the first transistor T1 is initialized to the initialization voltage VINT. The second period st2 is a period when the threshold voltage of the first transistor T1 is sampled. The third period st3 is an idle period.

The scan signal SW from the scan line SWL has the gate-on voltage Von during the first period st1 and has the gate-off voltage Voff during the second and third periods st2 and st3. The sensing signal SS from the scan sensing line SSL has the gate-on voltage Von during the first and second periods st1 and st2 and has the gate-off voltage Voff during the third period st3. The emission signal EM from the emission line EML and the scan bias signal SB from the scan bias line SBL have the gate-off voltage during the first, second, and third periods st1, st2, and st3.

Figure 15:
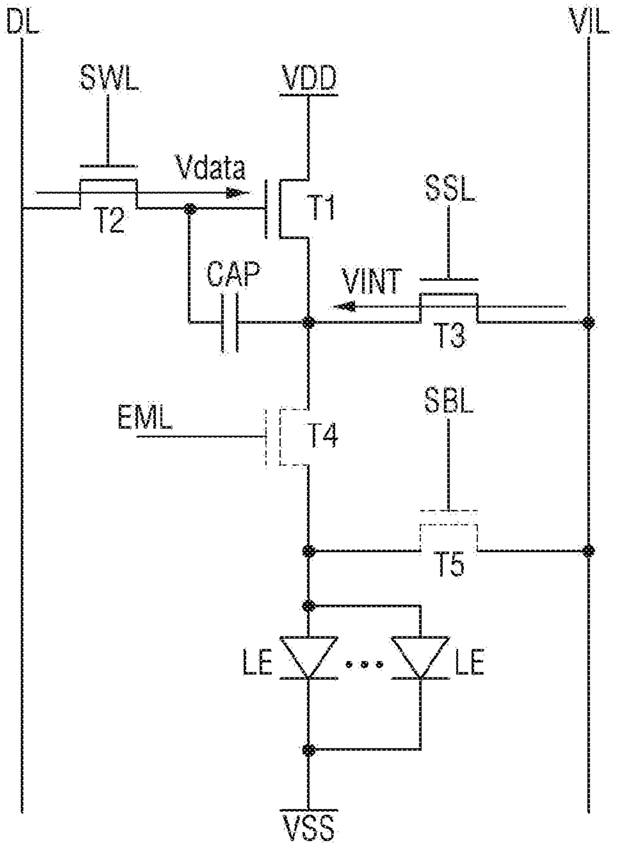
FIGS. 15 and 16 are circuit diagrams illustrating operations of a subpixel during a first sensing period.
Figure 16:
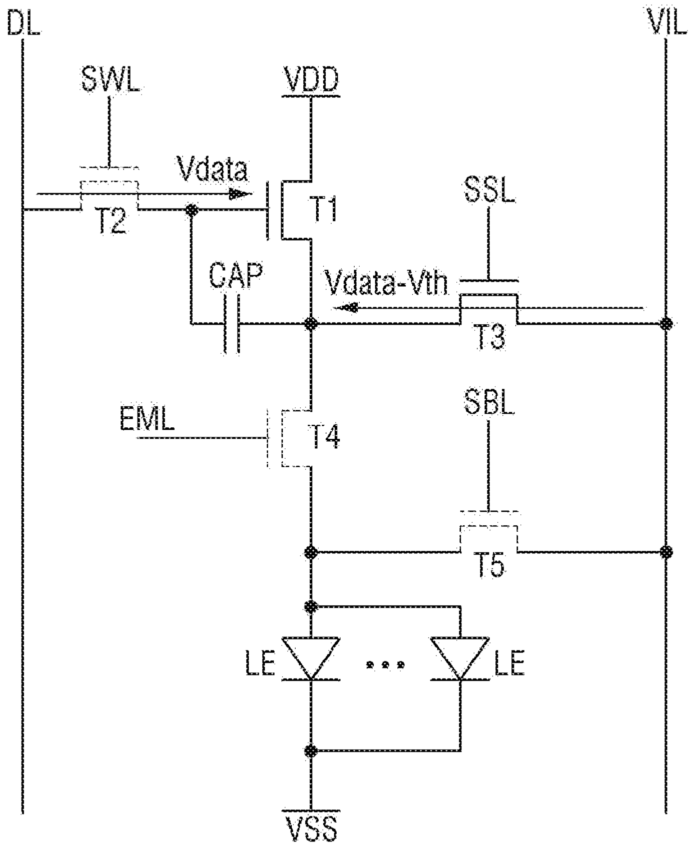

FIGS. 15 and 16 are circuit diagrams illustrating operations of a subpixel during a first sensing period.

Operations of the subpixel SP during the first, second, and third periods st1, st2, and st3 of the first sensing period SEP1 will hereinafter be described with reference to FIGS. 14 through 16.

First, referring to FIG. 15, during the first period st1, the second transistor T2 is turned on by the scan signal SW with the gate-on voltage Von, which is applied to the scan lien SWL. During the first period st1, the third transistor T3 is turned on by the scan sensing signal SS with the gate-on voltage Von, which is applied to the scan sensing line SSL. During the first period st1, the fourth transistor T4 is turned off by the emission signal EM with the gate-off voltage Voff, which is applied to the emission line EML. During the first period st1, the fifth transistor T5 is turned off by the scan bias signal SB with the gate-off voltage Voff, which is applied to the scan bias line SBL.

During the first period st1, as the second transistor T2 is turned on, the data voltage Vdata from the data line DL is applied to the gate electrode of the first transistor T1. During the first period st1, as the third transistor T3 is turned on, the initialization voltage VINT from the sensing line VIL is applied to the first electrode of the first transistor T1.

Second, referring to FIG. 16, during the second period st2, the second transistor T2 is turned off by the scan signal SW with the gate-off voltage Voff, which is applied to the scan line SWL. During the second period st2, the third transistor T3 is turned on by the scan sensing signal SS with the gate-on voltage Von, which is applied to the scan sensing line SSL. During the second period st2, the fourth transistor T4 is turned off by the emission signal EM with the gate-off voltage Voff, which is applied to the emission line EML. During the second period st2, the fifth transistor T5 is turned off by the scan bias signal SB with the gate-off voltage Voff, which is applied to the scan bias line SBL.

During the second period st2, as a voltage difference (Vgs=Vdata1−VINT) between the gate electrode and the first electrode of the first transistor T1 is greater than the threshold voltage of the first transistor T1, the first transistor T1 flows a current until the voltage difference Vgs between the gate electrode and the first electrode of the first transistor T1 reaches a threshold voltage Vth of the first transistor T1. As a result, the voltage of the first electrode of the first transistor T1 rises to "Vdata-Vth", as shown in FIG. 16. That is, during the second period st2, the threshold voltage of the first transistor T1 may be sampled from the first electrode of the first transistor T1, and the voltage of the first electrode of the first transistor T1 may be sensed via the sensing line VIL.

Third, during the third period st3, the second transistor T2 is turned off by the scan signal SW with the gate-off voltage Voff, which is applied to the scan line SWL. During the second period st2, the third transistor T3 is turned off by the scan sensing signal SS with the gate-off voltage Voff, which is applied to the scan sensing line SSL. During the third period st3, the fourth transistor T4 is turned off by the emission signal EM with the gate-off voltage Voff, which is applied to the emission line EML. During the third period st3, the fifth transistor T5 is turned off by the scan bias signal SB with the gate-off voltage Voff, which is applied to the scan bias line SBL. That is, during the third period st3, as the second, third, fourth, and fifth transistors T2, T3, T4, and T5 are all turned off, the third period st3 corresponds to an idle period of the subpixel SP.

Figure 17:
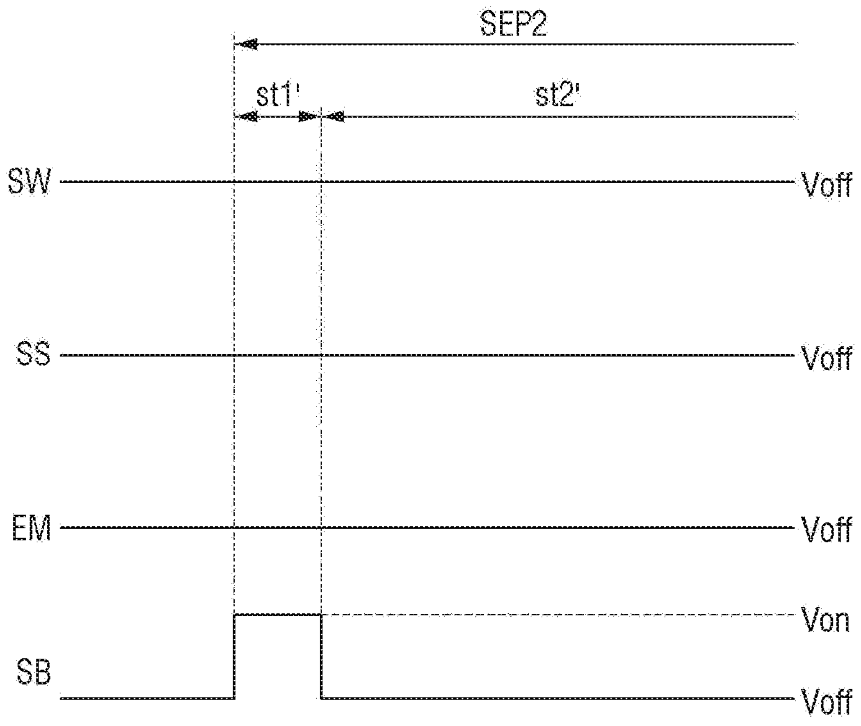
FIG. 17 is a timing diagram showing a scan signal, a sensing signal, a scan bias signal, and an emission signal applied to the subpixel of FIG. 5 during a second sensing period.

FIG. 17 is a timing diagram showing a scan signal, a sensing signal, a scan bias signal, and an emission signal applied to the subpixel of FIG. 5 during a second sensing period.

Referring to FIG. 17, a second sensing period SEP2 may be a period for sensing an anode voltage Vand of the first electrodes of the light-emitting elements LE of the subpixel SP. The second sensing period SEP2 may include first and second periods st1' and st2'.

The first period st1' is a period when the fifth transistor T5 is turned on to connect the first electrodes of the light-emitting elements LE and the sensing line VIL. The second period st2' is an idle period.

The scan signal SW from the scan line SWL, the sensing signal SS from the scan sensing line SSL, and the emission signal EM from the emission line EML have the gate-off voltage Voff during the first and second periods st1' and st2'. The scan bias signal SB from the scan bias line SBL has the gate-on voltage Von during the first period st1' and has the gate-off voltage Voff during the second period st2'.

Figure 18:
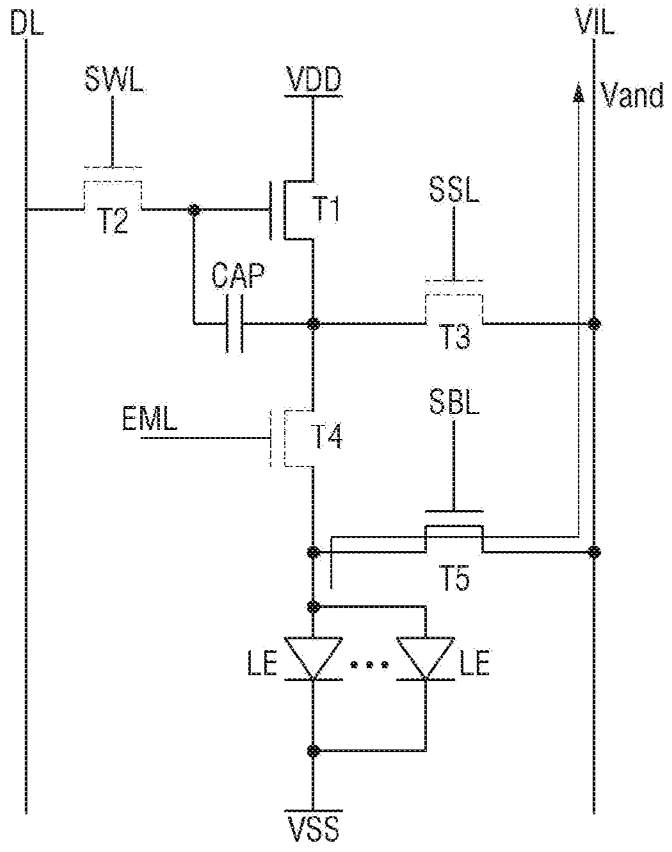
FIG. 18 is a circuit diagram illustrating an operation of a subpixel during a second sensing period.

FIG. 18 is a circuit diagram illustrating an operation of a subpixel during a second sensing period.

An operation of the subpixel SP during the first and second periods st1' and st2' of the second sensing period SEP2 will hereinafter be described with reference to FIGS. 17 and 18.

First, referring to FIG. 18, during the first period st1', the second transistor T2 is turned on by the scan signal SW with the gate-off voltage Voff, which is applied to the scan line SWL. During the first period st1', the third transistor T3 is turned off by the scan sensing signal SS with the gate-off voltage Voff, which is applied to the scan sensing line SSL. During the first period st1', the fourth transistor T4 is turned off by the emission signal EM with the gate-off voltage Voff, which is applied to the emission line EML. During the first period st1', the fifth transistor T5 is turned on by the scan bias signal SB with the gate-on voltage Von, which is applied to the scan bias line SBL.

During the first period st1', as the fifth transistor T5 is turned on, the first electrodes of the light-emitting elements LE may be connected to the sensing line VIL. As a result, the anode voltage Vand may be sensed via the sensing line VIL.

In one or more embodiments, in a case where the light-emitting elements LE are inorganic light-emitting elements, the light-emitting elements LE may be aligned using a first alignment electrode ("171" of FIG. 20), which is connected to the first electrode of the first transistor T1, and a second alignment electrode ("173" of FIG. 20), which is connected to the second power line to which the second power supply voltage VSS is applied. In this case, the first electrodes of the light-emitting elements LE may be disposed adjacent to the first alignment electrode ("171" of FIG. 20), and the second electrodes of the light-emitting elements LE may be disposed adjacent to the second alignment electrode ("173" of FIG. 20). However, some of the light-emitting elements LE may be misaligned. For example, the first electrodes of the misaligned light-emitting elements LE may be disposed adjacent to the second alignment electrode ("173" of FIG. 20), and the second electrodes of the misaligned light-emitting elements LE may be disposed adjacent to the first alignment electrode ("171" of FIG. 20). The greater the number of misaligned light-emitting elements LE, the higher the anode voltage Vand. Accordingly, the number of misaligned light-emitting elements LE may be determined based on the anode voltage Vand.

Second, during the third period st3 (e.g., see FIG. 14), the second transistor T2 is turned off by the scan signal SW with the gate-off voltage Voff, which is applied to the scan line SWL. During the third period st3, the third transistor T3 is turned off by the scan sensing signal SS with the gate-off voltage Voff, which is applied to the scan sensing line SSL. During the third period st3, the fourth transistor T4 is turned off by the emission signal EM with the gate-off voltage Voff, which is applied to the emission line EML. During the third period st3, the fifth transistor T5 is turned off by the scan bias signal SB with the gate-off voltage Voff, which is applied to the scan bias line SBL. That is, as the second, third, fourth, and fifth transistors T2, T3, T4, and T5 are all turned off during the third period st3, the third period st3 corresponds to an idle period.

Figure 19:
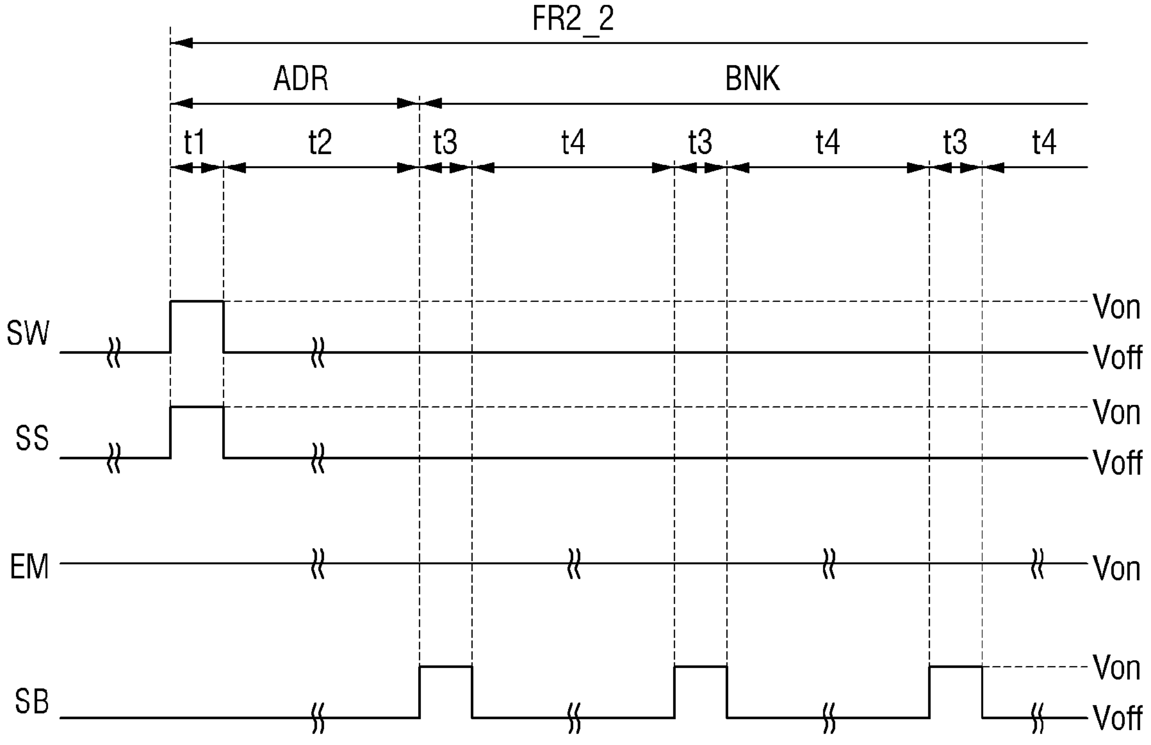
FIG. 19 is a timing diagram showing a scan signal, a sensing signal, a scan bias signal, and an emission signal applied to the subpixel of FIG. 5 during a second frame period.

FIG. 19 is a timing diagram showing a scan signal, a sensing signal, a scan bias signal, and an emission signal applied to the subpixel of FIG. 5 during a second frame period.

The embodiment of FIG. 19 only differs from the embodiment of FIG. 11 in that the emission signal EM is maintained to be turned on, rather than being turned off, during third periods t3, and thus, a detailed description thereof will be omitted.

Figure 20:
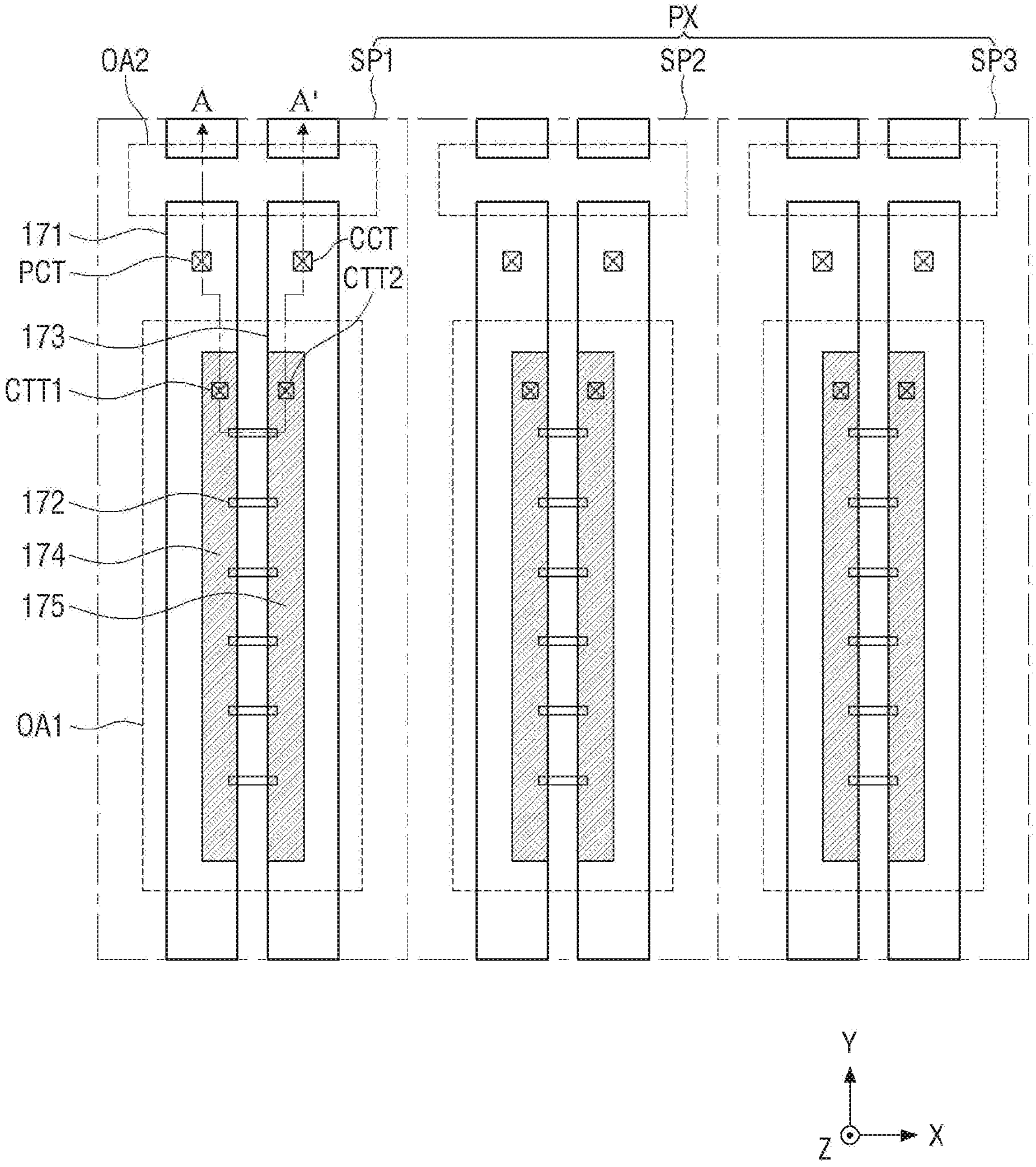
FIG. 20 is a layout view of a pixel according to one or more embodiments of the present disclosure.

FIG. 20 is a layout view of a pixel according to one or more embodiments of the present disclosure. Referring to FIG. 20, a pixel PX includes a plurality of subpixels (SP1, SP2, and SP3). The pixel SP is illustrated as including three subpixels (SP1, SP2, and SP3), i.e., first, second, and third subpixels SP1, SP2, and SP3, but the present disclosure is not limited thereto.

The first subpixel SP1 is a minimal unit for emitting light of a first color, the second subpixel SP2 is a minimal unit for emitting light of a second color, and the third subpixel SP3 is a minimal unit for emitting light of a third color. The first, second, and third colors may be red, green, and blue, respectively, but the present disclosure is not limited thereto. In one example, first light may be red light having a central wavelength of 600 nm to 750 nm, second light may be green light having a central wavelength of 480 nm to 560 nm, and third light may be blue light having a central wavelength of 370 nm to 490 nm.

Each of the first, second, and third subpixels SP1, SP2, and SP3 may include a first alignment electrode 171, light-emitting elements 172, a second alignment electrode 173, a first contact electrode 174, and a second contact electrode 175.

The first alignment electrode 171 may be a pixel electrode that is separate between different subpixels (SP1, SP2, and SP3), and the second alignment electrode 173 may be a common electrode that is separate between different subpixels (SP1, SP2, and SP3). In one example, the first alignment electrode 171 may be an anode electrode electrically connected to first electrodes of the light-emitting elements 172, and the second alignment electrode 173 may be a cathode electrode electrically connected to second electrodes of the light-emitting elements 172.

The first and second alignment electrodes 171 and 173 may extend in the second direction (or the Y-axis direction). The first and second alignment electrodes 171 and 173 may be disposed to be spaced from each other and may be electrically isolated from each other.

The first alignment electrode 171 may be electrically connected to a first electrode of a first transistor ("T1" of FIG. 5) through a pixel contact hole PCT. The second alignment electrode 173 may be electrically connected to a second power line, to which a second power supply voltage ("VSS" of FIG. 5) is applied, through a common contact hole CCT.

FIG. 20 illustrates that each of the first, second, and third subpixels SP1, SP2, and SP3 includes one first alignment electrode 171 and one second alignment electrode 173, but the present disclosure is not limited thereto. Alternatively, each of the first, second, and third subpixels SP1, SP2, and SP3 may include two or more first alignment electrodes 171 and two or more second alignment electrodes 173. Alternatively, each of the first, second, and third subpixels SP1, SP2, and SP3 may include two first alignment electrodes 171 and one second alignment electrode 173.

The first and second contact electrodes 174 and 175 may extend in the second direction (or the Y-axis direction). The length, in the second direction (or the Y-axis direction), of the first contact electrode 174 may be smaller than the length, in the second direction (or the Y-axis direction), of the first alignment electrode 171. The length, in the second direction (or the Y-axis direction), of the second contact electrode 175 may be smaller than the length, in the second direction (or the Y-axis direction), of the second alignment electrode 173. The width, in the first direction (or the X-axis direction), of the first contact electrode 174 may be smaller than the width, in the second direction (or the Y-axis direction), of the first alignment electrode 171. The width, in the first direction (or the X-axis direction), of the second contact electrode 175 may be smaller than the width, in the first direction (or the X-axis direction), of the second alignment electrode 173.

The first contact electrode 174 may overlap with the first alignment electrode 171 in a third direction (or a Z-axis direction). The first contact electrode 174 may be connected to the first alignment electrode 171 through a first contact hole CTT1.

The second contact electrode 175 may overlap with the second alignment electrode 173 in the third direction (or the Z-axis direction). The second contact electrode 175 may be connected to the second alignment electrode 173 through a second contact hole CTT2.

The first contact electrode 174 may be in contact with the first ends of the light-emitting elements 172. The second contact electrode 175 may be in contact with the second ends of the light-emitting elements 172. Accordingly, the light-emitting elements 172 may be electrically connected to the first alignment electrode 171 via the first contact electrode 174 and to the second alignment electrode 174 via the second contact electrode 175.

The light-emitting elements 172 may be disposed to be spaced from one another. The light-emitting elements 172 may extend in the first direction (or the X-axis direction) and may be arranged along the second direction (or the Y-axis direction).

The light-emitting elements 172 may be disposed in a first opening OA1, which is defined by an external bank ("192" of FIG. 5). That is, the light-emitting elements 172 may not overlap with the external bank ("192" of FIG. 5) in the third direction (or the Z-axis direction).

The first ends of the light-emitting elements 172 may be in contact with the first contact electrode 174, and the second ends of the light-emitting elements 172 may be in contact with the second contact electrode 175. The first ends of the light-emitting elements 172 may overlap with the first alignment electrode 171 in the third direction (or the Z-axis direction), and the second ends of the light-emitting elements 172 may overlap with the second alignment electrode 173 in the third direction (or the Z-axis direction).

The light-emitting elements 172 may have a rod, wire, or tube shape. In one example, the light-emitting elements 172 may be formed as cylinders or rods. In another example, the light-emitting elements 172 may be formed as polyhedrons such as regular cubes or rectangular parallelepipeds or as polygonal columns such as hexagonal columns. In another example, the light-emitting elements 172 may be formed as truncated cones that extend in one direction and partially have inclined outer surfaces. The light-emitting elements 172 may have a length of 1 μm to 10 μm or 2 μm to 6 μm, preferably, 3 μm to 5 μm. The light-emitting elements 172 may have a diameter of 300 nm to 700 nm and an aspect ratio of 1.2 to 100.

The external bank ("192" of FIG. 5) may define the first opening OA1 and a second opening OA2 in each of the first, second, and third subpixels SP1, SP2, and SP3. The first opening OA1 may be an emission area where the light-emitting elements 172 are disposed. The second opening OA2 may be a separation area where the first and second alignment electrodes 171 and 173 are separated. In the second opening OA2, first alignment electrodes 171 of subpixels that are adjacent in the second direction (or the Y-axis direction) may be spaced from each other. In the second opening OA2, second alignment electrodes 173 of subpixels that are adjacent in the second direction (or the Y-axis direction) may be spaced from each other. The minimum distance, in the second direction (or the Y-axis direction), between the first alignment electrodes 171 may be smaller than the maximum length, in the second direction (or the Y-axis direction), of the second opening OA2. The minimum distance, in the second direction (or the Y-axis direction), between the second alignment electrodes 173 may be smaller than the maximum length, in the second direction (or the Y-axis direction), of the second opening OA2.

FIG. 20 illustrates that the first and second openings OA1 and OA2 are spaced from each other, but the present disclosure is not limited thereto. Alternatively, the first and second openings OA1 and OA2 may be integrally formed as a single opening.

Figure 21:
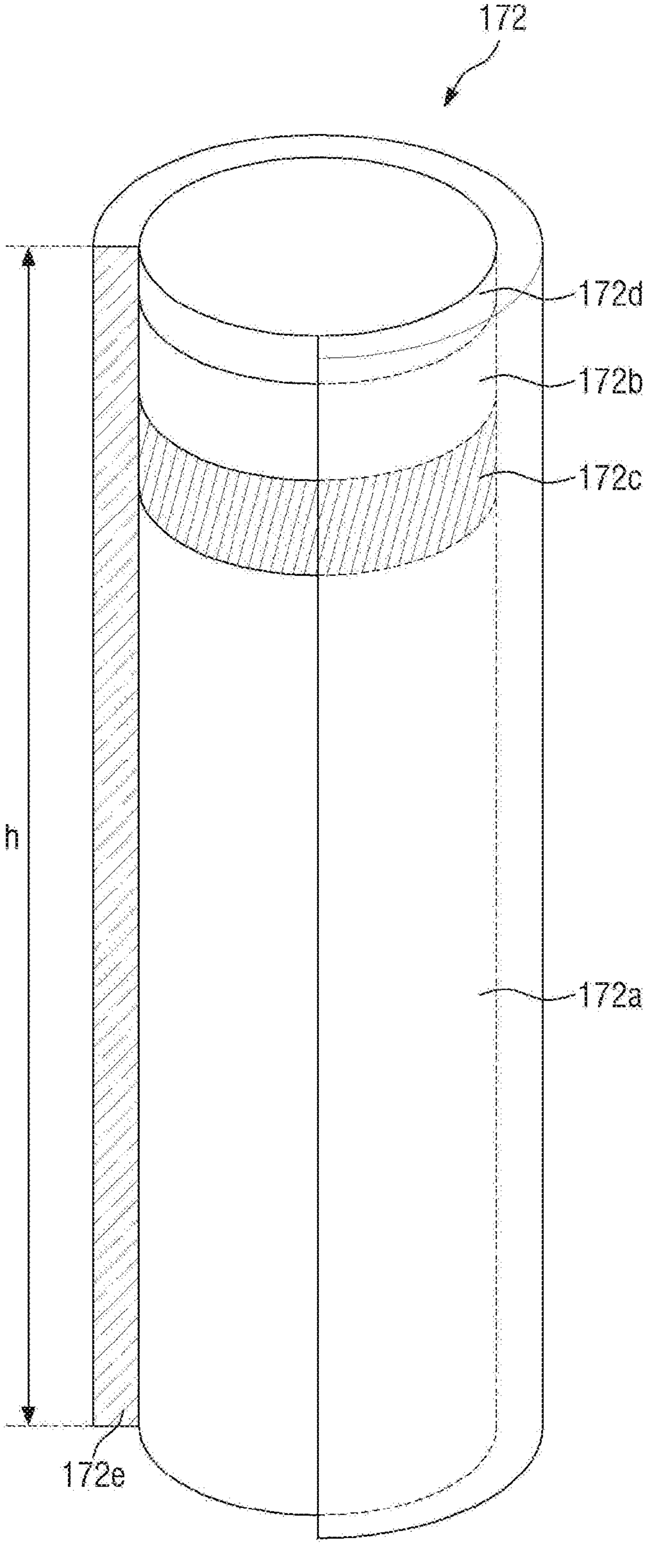
FIG. 21 illustrates a light-emitting element of FIG. 20.

FIG. 21 illustrates a light-emitting element of FIG. 20 according to one or more embodiments.

Referring to FIG. 21, a light-emitting element 172 may include a first semiconductor layer 172*a*, a second semiconductor layer 172*b*, an active layer 172*c*, an electrode layer 172*d*, and an insulating film 172*e*.

The light-emitting element 172 may extend in one direction and may have a rod, wire, or tube shape. In one example, the light-emitting element 172 may be formed as a cylinder or a rod. However, the shape of the light-emitting element 172 is not particularly limited. Alternatively, the light-emitting element 172 may be formed in various other shapes such as a polygonal prism such as a regular cube, a rectangular parallelepiped, or a hexagonal prism or as a structure that extends in one direction and is inclined in part on the outer surfaces thereof.

The light-emitting element 172 may include semiconductor layers that are doped with impurities of an arbitrary conductivity type (e.g., a p type or an n type). The semiconductor layers may receive an electrical signal applied thereto from an external power source and may thus emit light of a particular wavelength range. Multiple semiconductors included in the light-emitting element 172 may be sequentially arranged or stacked in one direction.

The light-emitting element 172 may include the first semiconductor layer 172*a*, the second semiconductor layer 172*b*, the active layer 172*c*, the electrode layer 172*d*, and the insulating film 172*e*. For convenience, FIG. 21 illustrates the first semiconductor layer 172*a*, the second semiconductor layer 172*b*, the active layer 172*c*, and the electrode layer 172*d* as being exposed due to part of the insulating film 172*e* being removed, and the insulating film 172*e* may be disposed to surround the outer surfaces (e.g., the outer peripheral or circumferential surfaces) of the first semiconductor layer 172$a$, the second semiconductor layer 172$b$, the active layer 172$c$, and the electrode layer 172$d$.

The first semiconductor layer 172$a$ may be an n-type semiconductor. In one example, in a case where the light-emitting element 172 emits blue-wavelength light, the first semiconductor layer 172$a$ may include a semiconductor material, i.e., $Al_xGa_yIn_{1-x-y}N$ (where $0 \leq x \leq 1$, $0 \leq y \leq 1$, and $0 \leq x+y \leq 1$). The semiconductor material may be, for example, at least one of AlGaInN, GaN, AlGaN, InGaN, AlN, and/or InN that are doped with an n-type dopant. The first semiconductor layer 172$a$ may be doped with an n-type dopant, and the n-type dopant may be, for example, Si, Ge, or Sn. In one example, the first semiconductor layer 172$a$ may be n-GaN doped with n-type Si. The first semiconductor layer 172$a$ may have a length of 1.5 μm to 5 μm, but the present disclosure is not limited thereto.

The second semiconductor layer 172$b$ is disposed on the active layer 172$c$. The second semiconductor layer 172$b$ may be a p-type semiconductor. In one example, in a case where the light-emitting element 172 emits blue or green wavelength light, the second semiconductor layer 172$b$ may include a semiconductor material, i.e., $Al_xGa_yIn_{1-x-y}N$ (where $0 \leq x \leq 1$, $0 \leq y \leq 1$, and $0 \leq x+y \leq 1$). The semiconductor material may be, for example, at least one of AlGaInN, GaN, AlGaN, InGaN, AlN, and/or InN that are doped with a p-type dopant. The second semiconductor layer 172$b$ may be doped with a p-type dopant, and the p-type dopant may be, for example, Mg, Zn, Ca, Se, and/or Ba. In one example, the second semiconductor layer 172$b$ may be p-GaN doped with n-type Mg. The second semiconductor layer 172$b$ may have a length of 0.05 μm to 0.10 μm, but the present disclosure is not limited thereto.

FIG. 21 illustrates that the first and second semiconductor layers 172$a$ and 172$b$ are single layers, but the present disclosure is not limited thereto. Alternatively, each of the first and second semiconductor layers 172$a$ and 172$b$ may include more than one layer depending on the material of the active layer 172$c$. In one example, each of the first and second semiconductor layers 172$a$ and 172$b$ may further include a clad layer or a tensile strain barrier reducing (TSBR) layer.

The active layer 172$c$ may be disposed between the first and second semiconductor layers 172$a$ and 172$b$. The active layer 172$c$ may include a single or multi-quantum well structure material. In a case where the active layer 172$c$ includes a material having a multi-quantum well structure, the active layer 172$c$ may have a structure in which multiple quantum layers and multiple well layers are alternately stacked. The active layer 172$c$ may emit light by combining electron-hole pairs in accordance with electrical signals applied thereto via the first and second semiconductor layers 172$a$ and 172$b$. In one example, in a case where the light-emitting element 172 emits blue-wavelength light, the active layer 172$c$ may include a material such as AlGaN or AlGaInN. In particular, in a case where the active layer 172$c$ has a multi-quantum well structure in which multiple quantum layers and multiple well layers are alternately stacked, the quantum layers may include a material such as AlGaN or AlGaInN, and the well layers may include a material such as GaN or AlInN. In one example, the active layer 172$c$ may include AlGaInN as its quantum layer and AlInN as its well layer and may thus be able to emit blue light having a central wavelength of 370 nm to 490 nm.

Alternatively, the active layer 172$c$ may have a structure in which a semiconductor material having a large band gap energy and a semiconductor material having a small band gap energy are alternately stacked or may include Group-III or Group-V semiconductor materials depending on the wavelength of light to be emitted. The type of light emitted by the active layer 172$c$ is not particularly limited. The active layer 172$c$ may emit red and green-wavelength light as necessary, instead of blue-wavelength light. The active layer 172$c$ may have a length of 0.05 μm to 0.10 μm, but the present disclosure is not limited thereto.

Light may be emitted from the active layer 172$c$ not only through the outer surface of the light-emitting element 172 along a lengthwise direction, but also through both sides (or both ends) of the light-emitting element 172. The directivity of light emitted from the active layer 172$c$ is not particularly limited.

The electrode layer 172$d$ may be an ohmic contact electrode, but the present disclosure is not limited thereto. Alternatively, the electrode layer 172$d$ may be a Schottky contact electrode. The light-emitting element 172 may include at least one electrode layer 172$d$. FIG. 21 illustrates that the light-emitting element 172 includes one electrode layer 172$d$, but alternatively, the light-emitting element 172 may include two or more electrode layers 172$d$. For example, the light-emitting element 172 may include an electrode layer disposed at the end of the second semiconductor layer 172$b$. In this example, the electrode layer 172$d$ may be defined as a first electrode of the light-emitting element 172 and the electrode disposed at the end of the second semiconductor layer 172$b$ may be defined as the first electrode of the light-emitting element 172.

The electrode layer 172$d$ may reduce the resistance between the light-emitting element 172 and the first contact electrode 174 when the first end of the light-emitting element 172 is placed in contact with the first contact electrode 174. The electrode layer 172$d$ may include a conductive metal. In one example, the electrode layer 172$d$ may include at least one of aluminum (Al), titanium (Ti), indium (In), gold (Au), silver (Ag), indium tin oxide (ITO), indium zinc oxide (IZO), and/or indium tin zinc oxide (ITZO). In another example, the electrode layer 172$d$ may include a semiconductor material doped with an n and/or p-type dopant. The electrode layer 172$d$ may have a length of 0.05 μm to 0.10 μm, but the present disclosure is not limited thereto.

The insulating film 172$e$ may be disposed to surround the outer surfaces (e.g., the outer peripheral or circumferential surfaces) of the first semiconductor layer 172$a$, the second semiconductor layer 172$b$, the active layer 172$c$, and the electrode layer 172$d$. The insulating film 172$e$ may protect the first semiconductor layer 172$a$, the second semiconductor layer 172$b$, the active layer 172$c$, and the electrode layer 172$d$. In one example, the insulating film 172$e$ may be formed to expose both end portions, in a length direction, of the light-emitting element 172.

FIG. 21 illustrates that the insulating film 172$e$ extends in the length direction of the light-emitting element 172 to cover the light-emitting element 172, ranging from the first semiconductor layer 172$a$ to the electrode layer 172$d$, but the present disclosure is not limited thereto. Alternatively, the insulating film 172$e$ may cover only the outer surface (e.g., the outer peripheral or circumferential surface) of the active layer 172$c$ and parts of the outer surfaces (e.g., the outer peripheral or circumferential surfaces) of the first and second semiconductor layers 172$a$ and 172$b$. Alternatively, the insulating film 172$e$ may cover only part of the outer surface (e.g., the outer peripheral or circumferential surface) of the electrode layer 172$d$, and as a result, part of the outer surface (e.g., the outer peripheral or circumferential surface) of the electrode layer 172$d$ may not be covered by the insulating film 172$e$, but partially exposed.

The insulating film 172e may have a thickness of 10 nm to 1.0 μm, but the present disclosure is not limited thereto. In one or more embodiments, the insulating film 172e may have a thickness of about 40 nm.

The insulating film 172e may include a material with an insulating property such as, for example, silicon oxide ($SiO_x$), silicon nitride ($SiN_x$), silicon oxynitride ($SiO_xN_y$), aluminum nitride (AlN), or aluminum oxide ($Al_2O_3$). Accordingly, the insulating film 172e can prevent a short circuit that may occur when the active layer 172c is placed in direct contact with the first or second contact electrode 174 or 175. As the insulating film 172e surrounds the active layer 172c and thereby protects the outer surface (e.g., the outer peripheral or circumferential surface) of the light-emitting element 172, any decrease in emission efficiency can be prevented.

The light-emitting element 172 may be included in a suitable coating solution (e.g., a predetermined coating solution) during the fabrication of the display device 10. The surface of the insulating film 172e may be hydrophobically or hydrophilically treated to properly separate the light-emitting element 172 from other light-emitting elements 172 in the coating solution without coagulation.

The light-emitting element 172 may have a length h of 1 μm to 10 μm or 2 μm to 6 μm, preferably, 3 μm to 5 μm. The light-emitting element 172 may have a diameter of 300 nm to 700 nm and an aspect ratio of 1.2 to 100. The diameter of the light-emitting element 172 may vary depending on the composition of the active layer 172c. In one or more embodiments, the light-emitting element 172 may have a diameter of about 500 nm.

Figure 22:
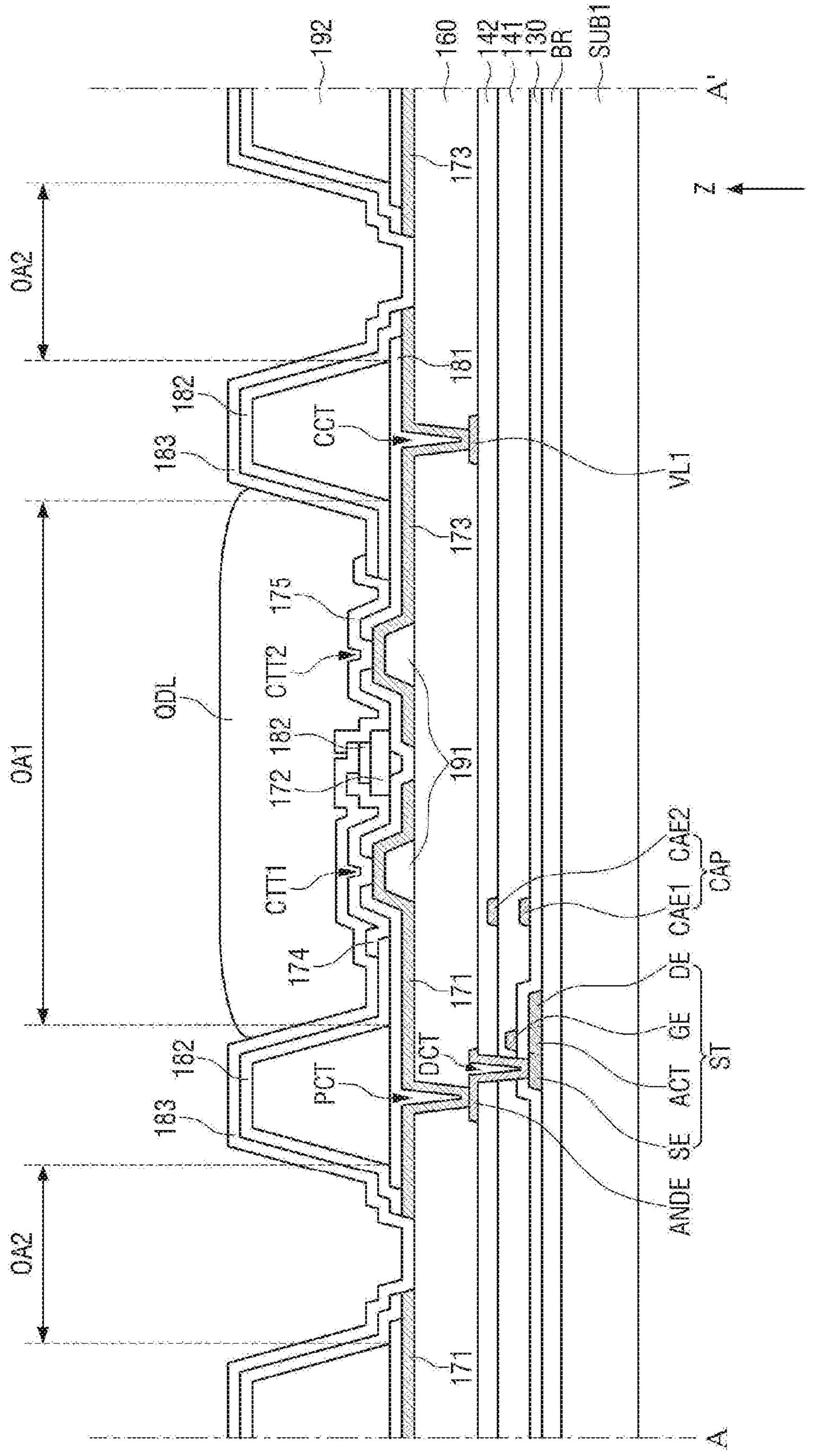
FIG. 22 is a cross-sectional view, taken along the line A-A' of FIG. 20, of a display panel.

FIG. 22 is a cross-sectional view, taken along the line A-A' of FIG. 20, of a display panel.

Referring to FIG. 22, a first subpixel SP1 may include at least one transistor ST, at least one capacitor CAP, a first alignment electrode 171, light-emitting elements 172, a second alignment electrode 173, a first contact electrode 174, a second contact electrode 175, and a first wavelength conversion layer QDL.

The substrate SUB1 may be formed of an insulating material such as glass, quartz, or a polymer resin. The substrate SUB1 may be a rigid substrate or a flexible substrate that is bendable, foldable, or rollable.

A barrier film BR may be disposed on the substrate SUB1. The barrier film BR may be a film for protecting the transistor ST from moisture that may penetrate into the first substrate SUB1, which is susceptible to moisture. The barrier film BR may include a plurality of inorganic films that are alternately stacked. In one example, the barrier film BR may be formed as a multifilm in which inorganic films including at least one of $SiO_x$, $SiN_x$, and $SiO_xN_y$ are alternately stacked.

A semiconductor layer including an active layer ACT, a first electrode SE, and a second electrode DE of the transistor ST may be disposed on the barrier film BR. The semiconductor layer may include polycrystalline silicon, monocrystalline silicon, low-temperature polycrystalline silicon, amorphous silicon, or an oxide semiconductor. The first electrode SE and the second electrode DE may be formed of a silicon or oxide semiconductor doped with ions or impurities and may thus have conductivity. The active layer ACT may overlap with a gate electrode GE of the transistor ST in the thickness direction of the substrate SUB1, i.e., in the third direction (or the Z-axis direction), but the first electrode SE and the second electrode DE may not overlap with the gate electrode GE in the third direction (or the Z-axis direction).

A gate insulating film 130 may be disposed on the active layer ACT, the first electrode SE, the second electrode DE, and barrier film BR. The gate insulating film 130 may include an inorganic film such as, for example, a film of $SiO_x$, $SiN_x$, and $SiO_xN_y$.

A first gate conductive layer including the gate electrode GE of the transistor ST and a first capacitor electrode CAE1 of the capacitor CAP may be disposed on the gate insulating film 130. The gate electrode GE may overlap with the active layer ACT in the third direction (or the Z-axis direction). The first gate conductive layer may be formed as a single layer or a multilayer including at least one of molybdenum (Mo), Al, chromium (Cr), Au, Ti, nickel (Ni), neodymium (Nd), copper (Cu), and/or an alloy thereof.

A first interlayer insulating film 141 may be disposed on the gate electrode GE and the first capacitor electrode CAE1. The first interlayer insulating film 141 may include an inorganic film such as, for example, a film of $SiO_x$, $SiN_x$, and $SiO_xN_y$.

A second gate conductive layer including a second capacitor electrode CAE2 of the capacitor CAP may be disposed on the first interlayer insulating film 141. As the first interlayer insulating film 141 has a suitable dielectric constant (e.g., a predetermined dielectric constant), the capacitor CAP may be formed by the first capacitor electrode CAE1, the second capacitor electrode CAE2, and the first interlayer insulating film 141. The second capacitor electrode CAE2 may be formed as a single layer or a multilayer including at least one of Mo, Al, Cr, Au, Ti, Ni, Nd, Cu, and/or an alloy thereof.

A second interlayer insulating film 142 may be disposed on the second capacitor electrode CAE2. The second interlayer insulating film 142 may include an inorganic film such as, for example, a film of $SiO_x$, $SiN_x$, and/or $SiO_xN_y$.

A data conductive layer including a connecting electrode ANDE and the first power line VL1 may be disposed on the second interlayer insulating film 142. The connecting electrode ANDE may be connected to the first electrode SE through a drain contact hole DCT, which penetrates the gate insulating film 130, the first interlayer insulating film 141, and the second interlayer insulating film 142 and thereby exposes the first electrode SE of the transistor ST. A first power supply voltage may be applied to the first power line VL1. The first power supply line VL1 may extend in the first direction (or the X-axis direction), but the present disclosure is not limited thereto. The data conductive layer may be formed as a single layer or a multilayer including at least one of Mo, Al, Cr, Au, Ti, Ni, Nd, Cu, and/or an alloy thereof.

A planarization film 160, which is for planarizing a height difference formed by the transistor ST, may be disposed on the connecting electrode ANDE. The planarization film 160 may be formed as an organic film including a photosensitive resin such as an acrylic resin, an epoxy resin, a phenolic resin, a polyamide resin, and/or a polyimide resin.

The first alignment electrode 171, the second alignment electrode 173, and internal banks 191 may be disposed on the planarization film 160.

The internal banks 191 may be disposed in a first opening OA1 defined by the external bank 192. The light-emitting elements 172 may be disposed between a pair of adjacent internal banks 191. Each of the internal banks 191 may have a bottom surface that is in contact with the planarization film 160, a top surface that is opposite to the bottom surface, and side surfaces that are between the top and bottom surfaces. The internal banks 191 may have a trapezoidal shape in a cross-sectional view, but the present disclosure is not limited thereto.

The internal banks 191 may be formed as organic films including a photosensitive resin such as an acrylic resin, an epoxy resin, a phenolic resin, a polyamide resin, or a polyimide resin. In one example, the internal banks 191 may be formed of a photoresist resin such as a positive or negative photoresist resin.

The first alignment electrode 171 may be disposed on the planarization film 160 and the internal banks 191. The first alignment electrode 171 may be disposed on at least one side surface and the top surface of each of the internal banks 191. The first alignment electrode 171 may be connected to the connecting electrode ANDE through a pixel contact hole PCT, which penetrates the planarization film 160. Accordingly, the first alignment electrode 171 may be electrically connected to the electrode SE of the transistor ST. The pixel contact hole PCT may overlap with the external bank 192 in the third direction (or the Z-axis direction). The pixel contact hole PCT may be disposed between the first opening OA1 and a second opening OA2.

The second alignment electrode 173 may be disposed on the planarization film 160 and the internal banks 191. The second alignment electrode 173 may be disposed on at least one side surface and the top surface of each of the internal banks 191. The second alignment electrode 173 may be connected to the first power line VL1 through a common contact hole CCT, which penetrates the planarization film 160. The common contact hole CCT may overlap with the external bank 192 in the third direction (or the Z-axis direction). The common contact hole CCT may be disposed between the first and second openings OA1 and OA2.

The first and second alignment electrodes 171 and 173 may include a conductive material with high reflectance. In one example, the first and second alignment electrodes 171 and 173 may include a metal such as Ag, Cu, or Al. Accordingly, light emitted from the light-emitting elements 172 to travel toward the first and second alignment electrodes 171 and 173 may be reflected by the first and second alignment electrodes 171 and 173 and may thereby travel beyond the tops of the light-emitting elements 172.

A first insulating film 181 may be disposed on the first and second alignment electrodes 171 and 173. The first insulating film 181 may be disposed on parts of the planarization film 160 not covered, but exposed, by the first and second alignment electrodes 171 and 173. The first insulating film 181 may include an inorganic film such as, for example, a film of $SiO_x$, $SiN_x$, and/or $SiO_xN_y$.

The external bank 192 may be disposed on the first insulating film 181. The external bank 192 may define the first and second openings OA1 and OA2. The external bank 192 may not overlap with the internal banks 191. The external bank 192 may have a bottom surface that is in contact with the first insulating film 181, a top surface that is opposite to the bottom surface, and side surfaces that are between the top and bottom surfaces. The external bank 192 may have a trapezoidal shape in a cross-sectional view, but the present disclosure is not limited thereto.

The external bank 192 may be formed as an organic film including a photosensitive resin such as an acrylic resin, an epoxy resin, a phenolic resin, a polyamide resin, or a polyimide resin. In one example, the external bank 192 may be formed of a photoresist resin such as a positive or negative photoresist resin.

The light-emitting elements 172 may be disposed on the first insulating film 181. A second insulating film 182 may be disposed on the light-emitting elements 172. The second insulating film 182 may be disposed on the external bank 192. The second insulating film 182 may be disposed on parts of the first and second alignment electrodes 171 and 173 not covered, but exposed, by the first insulating film 181, in the second opening OA2. The second insulating film 182 may include an inorganic film such as, for example, a film of $SiO_x$, $SiN_x$, and/or $SiO_xN_y$.

The first contact electrode 174 may be connected to the first alignment electrode 171 through a first contact hole CCT1, which penetrates the first insulating film 181. The first contact hole CCT1 may overlap with one of the internal banks 191 in the third direction (or the Z-axis direction). The first contact electrode 174 may be in contact with the first ends of the light-emitting elements 172. Accordingly, the first ends of the light-emitting elements 172 may be electrically connected to the first alignment electrode 171 via the first contact electrode 174. The first contact electrode 174 may be disposed on the second insulating film 182.

A third insulating film 183 may be disposed on the first contact electrode 174. The third insulating film 183 may be disposed to cover the first contact electrode 174 to electrically isolate the first and second contact electrodes 174 and 175. The third insulating film 183 may also cover parts of the second insulating film 182 on the external bank 192. The third insulating film 183 may be disposed in separation areas SA1 and SA2 of the first and second alignment electrodes 171 and 173, in the second opening OA2. That is, the third insulating film 183 may be disposed on part of the planarization film 160, not covered, but exposed, by the first and second alignment electrodes 171 and 173, but in the second opening OA2. The third insulating film 183 may include an inorganic film such as, for example, a film of $SiO_x$, $SiN_x$, and/or $SiO_xN_y$.

The second contact electrode 175 may be connected to the second alignment electrode 173 through a second contact hole CCT2, which penetrates the first insulating film 181. The second contact hole CCT2 may overlap with one of the internal banks 191 in the third direction (or the Z-axis direction). The second contact electrode 175 may be in contact with the second ends of the light-emitting elements 172. Accordingly, the second ends of the light-emitting elements 172 may be electrically connected to the second alignment electrode 173 via the second contact electrode 175. The second contact electrode 175 may be disposed on the third insulating film 183.

The first and second contact electrodes 174 and 175 may be formed of a transparent conductive oxide (TCO) capable of transmitting light therethrough, such as ITO or IZO. Accordingly, light-emitted from the light-emitting elements 172 can be prevented from being blocked by the first and second contact electrodes 174 and 175.

The first ends of the light-emitting elements 172 may be electrically connected to the source electrode SE of the transistor ST via the first contact electrode 174 and the first alignment electrode 171, and the second ends of the light-emitting elements 172 may be electrically connected to the first power line VL1 through the second contact electrode 175 and the second alignment electrode 173. Accordingly, the light-emitting elements 172 may emit light in accordance with a current that flows from the first ends to the second ends thereof.

The first wavelength conversion layer QDL may be disposed in the first subpixel SP1, a second wavelength conversion layer may be disposed in a second subpixel SP2, and a transparent insulating film may be disposed in a third subpixel SP3. The light-emitting elements 172 of each of the first, second, and third subpixels SP1, SP2, and SP3 may emit third light. The third light may be short-wavelength light such as blue light or ultraviolet (UV) light having a central wavelength of 370 nm to 490 nm.

The first wavelength conversion layer QDL may convert the third light emitted from the light-emitting elements 172 of the first subpixel SP1 into first light. The first light may be red light having a central wavelength of 600 nm to 750 nm.

The second wavelength conversion layer may convert the third light emitted from light-emitting elements 172 of the second subpixel SP2 into second light. The second light may be green light having a central wavelength of 480 nm to 560 nm.

Each of the first wavelength conversion layer QDL and the second wavelength conversion layer may include a base resin, a wavelength shifter, and a scatterer.

The base resin may include a material having high light transmittance and having excellent dispersion properties for the wavelength shifter and the scatterer. In one example, the base resin may include an organic material such as an epoxy resin, an acrylic resin, a cardo resin, and/or an imide resin.

The wavelength shifter may convert or shift the wavelength of incident light. The wavelength shifter may be quantum dots, quantum rods, or a phosphor. The size of the quantum dots of the first wavelength conversion layer QDL may differ from the size of the quantum dots of the second wavelength conversion layer.

The scatterer may scatter incident light in random directions without substantially changing the wavelength of the incident light passing through the first wavelength conversion layer QDL or the second wavelength conversion layer. In this manner, the path of light passing through the first wavelength conversion layer QDL or the second wavelength conversion layer can be lengthened, and as a result, the color conversion efficiency of the wavelength shifter can be enhanced. The scatterer may include light-scattering particles. The scatterer may include particles of a metal oxide such as, for example, titanium oxide ($TiO_2$), silicon oxide ($SiO_2$), zirconium oxide ($ZrO_2$), $Al_2O_3$, indium oxide ($In_2O_3$), zinc oxide (ZnO), and/or tin oxide ($SnO_2$). Alternatively, the scatterer may include organic particles such as, for example, particles of an acrylic resin or a urethane resin.

The transparent insulating film may transmit short-wavelength light such as blue light or UV light therethrough as it is. The transparent insulating film may be formed as an organic film with high transmittance.

The first wavelength conversion layer QDL may be disposed on the second contact electrode 175 and the third insulating film 183, in the first subpixel SP1. The arrangement of the second wavelength conversion layer in the second subpixel SP2 and the arrangement of the transparent insulating film in the third subpixel SP3 may be substantially the same as the arrangement of the first wavelength conversion layer QDL in the first subpixel SP1, and thus, detailed descriptions thereof will be omitted.

A first color filter may be disposed on the first wavelength conversion layer QDL. The first color filter may transmit first light, for example, red-wavelength light, therethrough. Thus, short-wavelength light that fails to be converted into first light after emitted from the light-emitting elements 172 of the first subpixel SP1 may not pass through the first color filter. On the contrary, short-wavelength light that is converted into first light by the first wavelength conversion layer QDL may pass through the first color filter.

A second color filter may be disposed on the second wavelength conversion layer. The second color filter may transmit second light, for example, green-wavelength light, therethrough. Thus, short-wavelength light that fails to be converted into second light after emitted from the light-emitting elements 172 of the second subpixel SP2 may not pass through the second color filter. On the contrary, short-wavelength light that is converted into second light by the second wavelength conversion layer may pass through the second color filter.

A third color filter may be disposed on the transparent insulating film. The third color filter may transmit third light, for example, blue-wavelength light, therethrough. Thus, short-wavelength light emitted from light-emitting elements 172 of the third subpixel SP3 may pass through the third color filter.

A black matrix may be disposed on the first, second, and third color filters. The black matrix may also be disposed between the first, second, and third color filters. The black matrix may include a light-blocking material capable of blocking the transmission of light. In this case, the black matrix may include an inorganic black pigment such as carbon black or an organic black pigment.

The second and third subpixels SP2 and SP3 may be substantially the same as the first subpixel SP1 of FIG. 22, except for the first wavelength conversion layer QDL and the first color filter, and thus, detailed descriptions thereof will be omitted.

Although the embodiments of the present disclosure have been described with reference to the accompanying drawings, those skilled in the art to which the present disclosure pertains can be implemented in other specific forms without changing the technical spirit or essential features of the present disclosure. Therefore, the embodiments described above should be understood as illustrative in all respects and not limiting.

What is claimed is:

1. A display device comprising:

a display panel comprising pixels, each of the pixels comprising at least one light-emitting element configured to emit light;

a timing controller configured to vary a driving frame frequency of the display panel in accordance with an input frame frequency of digital video data; and data drivers configured to output data voltages in accordance with the digital video data, wherein:

a first frame period, which corresponds to a first frame frequency, and a second frame period, which corresponds to a second frame frequency lower than the first frame frequency, are set under the control of the timing controller;

the second frame period comprises a data address period, during which the data voltages are applied to the respective pixels, and a blank period, during which the data voltages are not applied to the pixels;

the blank period comprises a plurality of initialization periods, wherein during each of the plurality of initialization periods, first electrode of the at least one light-emitting element is initialized to an initialization voltage.

2. The display device of claim 1, wherein a length of the blank period is equal to or greater than a length of the data addressing period.

3. The display device of claim 2, wherein:

the display panel is driven at a third frame frequency, which is lower than the first frame frequency and higher than the second frame frequency, during a third frame period, and the third frame period comprises the data address period and the blank period.

4. The display device of claim 3, wherein a number of the initialization periods of the blank period of the third frame period is the same as a number of initialization periods of the blank period of the second frame period.

5. The display device of claim 3, wherein a number of the initialization periods of the blank period of the third frame period is greater than a number of initialization periods of the blank period of the second frame period.

6. The display device of claim 3, wherein the data addressing period of the third frame period is equal to the data addressing period of the second frame period.

7. The display device of claim 1, wherein the second frame period is arranged after the first frame period.

8. The display device of claim 1, wherein:

the timing controller is configured to output first digital video data, which is input to the timing controller during the first frame period, to the data drivers during the second frame period, and the data drivers are configured to output the data voltages in accordance with the first digital video data during the second frame period.

9. The display device of claim 8, wherein:

during a first period of a first sensing period, the corresponding data voltage is applied to a gate electrode of a first transistor of the pixel and the initialization voltage is applied to the first electrode of the first transistor and the first electrode of the at least one light-emitting element; and during a second period of the first sensing period, a threshold voltage of the first transistor is sampled and sensed via a sensing line.

10. The display device of claim 8, wherein during a second sensing period, a voltage of the first electrode of the at least one light-emitting element is sensed via a sensing line.

11. The display device of claim 1, wherein each of the pixels comprises:

a first transistor configured to apply a driving current to the at least one light-emitting element in accordance with a corresponding data voltage;

a second transistor between a gate electrode of the first transistor and a data line;

a third transistor between a first electrode of the first transistor and a sensing line;

a fourth transistor between the first electrode of the first transistor and the first electrode of the at least one light-emitting element;

a fifth transistor between the first electrode of the at least one light-emitting element and the sensing line; and a capacitor between the gate electrode and the first electrode of the first transistor.

12. The display device of claim 11, wherein:

during a first period of the first frame period, the corresponding data voltage is applied to the gate electrode of the first transistor and the initialization voltage is applied to the first electrode of the at least one light-emitting element; and during a second period of the first frame period, the at least one light-emitting element emit light in accordance with a driving current from the first transistor, which flows in accordance with the corresponding data voltage.

13. The display device of claim 11, wherein:

during a first period of the data addressing period of the second frame period, the corresponding data voltage is applied to the gate electrode of the first transistor and the initialization voltage is applied to the first electrode of the first transistor and the first electrode of the at least one light-emitting element; and during a second period of the data addressing period of the second frame period, the at least one light-emitting element emit light in accordance with a driving current from the first transistor, which flows in accordance with the corresponding data voltage.

14. The display device of claim 11, wherein:

during a third period of the blank period of the second frame period, the initialization voltage is applied to the first electrode of the at least one light-emitting element; and during a fourth period of the blank period of the second frame period, the at least one light-emitting element are configured to emit light in accordance with a driving current from the first transistor, which flows in accordance with the corresponding data voltage.

15. The display device of claim 11, wherein:

during a third period of the blank period of the second frame period, the initialization voltage is applied to the first electrode of the first transistor and the first electrode of the at least one light-emitting element; and during a fourth period of the blank period of the second frame period, the at least one light-emitting element are configured to emit light in accordance with a driving current from the first transistor, which flows in accordance with the corresponding data voltage.

16. A display device comprising:

a data line configured to receive a data voltage;

a scan line configured to receive a scan signal;

a scan sensing line configured to receive a scan sensing signal;

an emission line configured to receive an emission signal;

a bias line configured to receive a scan bias signal; and a pixel connected to the data line, the scan line, the scan sensing line, the emission line, and the bias line, wherein the pixel comprises:

at least one light-emitting element configured to emit light in accordance with a driving current;

a first transistor configured to apply the driving current to the at least one light-emitting element in accordance with the data voltage;

a second transistor connecting a gate electrode of the first transistor and the data line in accordance with the scan signal from the scan line;

a third transistor connecting a first electrode of the first transistor and a sensing line in accordance with the scan sensing signal from the scan sensing line;

a fourth transistor connecting the first electrode of the first transistor and first electrode of the at least one light-emitting element in accordance with the emission signal from the emission line;

a fifth transistor connecting the first electrode of the at least one light-emitting element and the sensing line in accordance with the scan bias signal from the bias line; and a capacitor between the gate electrode and the first electrode of the first transistor, and wherein a blank period during which the data voltage is not applied to the pixel comprises an initialization period during which the first electrode of the at least one light-emitting element are initialized to an initialization voltage from the sensing line.

17. The display device of claim 16, wherein:

a first frame period comprises first and second periods, during the first period, the scan signal, the scan sensing signal, and the emission signal have a gate-on voltage and the scan bias signal has a gate-off voltage, during the second period, the emission signal has the gate-on voltage and the scan signal, the scan sensing signal, and the scan bias signal have the gate-off voltage, and the second, third, fourth, and fifth transistors are turned on by the gate-on voltage and are turned off by the gate-off voltage.

18. The display device of claim 16, wherein:

a second frame period comprises a data address period, during which the data voltage is applied to the pixel and the blank period, the data address period comprises first and second periods, during the first period, the scan signal, the scan sensing signal, and the emission signal have a gate-on voltage and the scan bias signal has a gate-off voltage, during the second period, the emission signal has the gate-on voltage and the scan signal, the scan sensing signal, and the scan bias signal have the gate-off voltage, and the second, third, fourth, and fifth transistors are turned on by the gate-on voltage and are turned off by the gate-off voltage.

19. The display device of claim 18, wherein:

the blank period comprises a third period, which corresponds to the initialization period, and a fourth period, during the third period, which corresponds to a first initialization period, the scan signal, the scan sensing signal, and the emission signal have the gate-off voltage and the scan bias signal has the gate-on voltage, and during the fourth period, the emission signal has the gate-on voltage and the scan signal, the scan sensing signal, and the scan bias signal have the gate-off voltage.

20. The display device of claim 18, wherein:

the blank period comprises a third period, which corresponds to the initialization period, and a fourth period, during the third period, the scan signal and the scan sensing signal have the gate-off voltage and the emission signal and the scan bias signal have the gate-on voltage, and during the fourth period, the emission signal has the gate-on voltage and the scan signal, the scan sensing signal, and the scan bias signal have the gate-off voltage.

21. The display device of claim 16, wherein:

a first sensing period during which a voltage of the first electrode of the first transistor is sensed comprises a first period, a second period, and a third period, during the first period, the scan signal and the scan sensing signal have a gate-on voltage and the emission signal and the scan bias signal have a gate-off voltage, during the second period, the scan sensing signal has the gate-on voltage and the scan signal, the emission signal, and the scan bias signal have the gate-off voltage, during the third period, the scan signal, the scan sensing signal, the emission signal, and the scan bias signal have the gate-off voltage, and the second, third, fourth, and fifth transistors are turned on by the gate-on voltage and are turned off by the gate-off voltage.

22. The display device of claim 16, wherein:

a second sensing signal during which a voltage of the first electrode of the at least one light-emitting element is sensed comprises a first period and a second period, during the first period, the scan bias signal has a gate-on voltage and the scan signal, the scan sensing signal, the emission signal, and the scan bias signal have a gate-off voltage, during the second period, the scan signal, the scan sensing signal, the emission signal, and the scan bias signal have the gate-off voltage, and the second, third, fourth, and fifth transistors are turned on by the gate-on voltage and are turned off by the gate-off voltage.

* * * * *